(12) United States Patent
Umeo

(10) Patent No.: US 10,070,059 B2
(45) Date of Patent: Sep. 4, 2018

(54) CONTROL DEVICE, CONTROL METHOD, AND CONTROL SYSTEM

(71) Applicant: SONY CORPORATION, Tokyo (JP)

(72) Inventor: Hiroyuki Umeo, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/323,456

(22) PCT Filed: Jul. 10, 2015

(86) PCT No.: PCT/JP2015/069826
§ 371 (c)(1),
(2) Date: Jan. 3, 2017

(87) PCT Pub. No.: WO2016/013409
PCT Pub. Date: Jan. 28, 2016

(65) Prior Publication Data
US 2017/0150050 A1    May 25, 2017

(30) Foreign Application Priority Data

Jul. 22, 2014  (JP) .................................. 2014-148836

(51) Int. Cl.
*H04N 5/232*  (2006.01)
*H04N 5/77*   (2006.01)

(52) U.S. Cl.
CPC ..... *H04N 5/23245* (2013.01); *H04N 5/23293* (2013.01); *H04N 5/77* (2013.01)

(58) Field of Classification Search
CPC .. H04N 5/23245; H04N 5/23293; H04N 5/77; H04N 5/23241
See application file for complete search history.

(56) References Cited

U.S. PATENT DOCUMENTS

| | | | | |
|---|---|---|---|---|
| 6,163,816 A | * | 12/2000 | Anderson | H04N 1/00204 348/E5.042 |
| 2008/0180548 A1 | * | 7/2008 | Kojima | H04N 5/23293 348/231.1 |
| 2011/0050945 A1 | * | 3/2011 | Konno | H04N 5/232 348/222.1 |

(Continued)

FOREIGN PATENT DOCUMENTS

| | | |
|---|---|---|
| JP | 2002-101166 A | 4/2002 |
| JP | 2005-176135 A | 6/2005 |

(Continued)

*Primary Examiner* — Timothy J Henn
(74) *Attorney, Agent, or Firm* — Chip Law Group

(57) ABSTRACT

The present technology relates to a control device, a control method, a program, and a control system capable of more certainly increasing a degree of perfection of a multi-view video content.

An obtaining unit obtains information regarding remaining operable time of each of a plurality of devices, and a setting unit sets an operation mode of at least one device out of the plurality of devices on the basis of the information regarding remaining operable time of each of the plurality of devices. The present technology may be applied to a controller which controls a plurality of GPS terminals, a controller which controls a plurality of portable game devices having a communication function and the like in addition to a controller which controls a plurality of cameras which records a multi-view video content, for example.

18 Claims, 21 Drawing Sheets

(56) References Cited

U.S. PATENT DOCUMENTS

| | | | | |
|---|---|---|---|---|
| 2013/0027213 A1* | 1/2013 | Miyata | ............... | H04N 5/23241 340/636.1 |
| 2014/0362246 A1* | 12/2014 | Nakano | ................. | H04N 5/247 348/211.4 |
| 2015/0207977 A1* | 7/2015 | Cho | ................... | H04N 5/23206 348/207.11 |
| 2016/0065829 A1* | 3/2016 | Kiso | ................. | H04N 5/23206 348/211.3 |

FOREIGN PATENT DOCUMENTS

| | | |
|---|---|---|
| JP | 2010-232908 A | 10/2010 |
| JP | 2013-115670 A | 6/2013 |
| JP | 2014-239318 A | 12/2014 |

\* cited by examiner

FIG. 11

| DIFFERENCE IN REMAINING OPERABLE TIME | RECORDING MODE |
|---|---|
| 0~14min | RECORDING MODE IS NOT CHANGED |
| 15~29min | UPPER LIMIT OF TRANSFER RATE OF LIVE VIEW IMAGE TO BE TRANSFERRED IS CHANGED TO 45 fps |
| 30~44min | UPPER LIMIT OF TRANSFER RATE OF LIVE VIEW IMAGE TO BE TRANSFERRED IS CHANGED TO 30 fps |
| 45~59min | UPPER LIMIT OF TRANSFER RATE OF LIVE VIEW IMAGE TO BE TRANSFERRED IS CHANGED TO 15 fps |
| 60min~ | LIVE VIEW IMAGE IS NOT TRANSFERRED |

FIG. 15

| DIFFERENCE IN REMAINING OPERABLE TIME | RECORDING MODE |
|---|---|
| 0~14min | RECORDING MODE IS NOT CHANGED |
| 15~29min | AUDIO RECORDING IS STOPPED |
| 30~44min | AUDIO RECORDING AND META DATA RECORDING ARE STOPPED |
| 45~59min | AUDIO RECORDING AND META DATA RECORDING ARE STOPPED |
| 60min~ | AUDIO RECORDING AND META DATA RECORDING ARE STOPPED AND RECORDING IMAGE QUALITY IS DECREASED BY ONE LEVEL |

CONTROL DEVICE, CONTROL METHOD, AND CONTROL SYSTEM

CROSS REFERENCE TO RELATED APPLICATIONS

This application is a U.S. National Phase of International Patent Application No. PCT/JP2015/069826 filed on Jul. 10, 2015, which claims priority benefit of Japanese Patent Application No. JP 2014-148836 filed in the Japan Patent Office on Jul. 22, 2014. Each of the above-referenced applications is hereby incorporated herein by reference in its entirety.

TECHNICAL FIELD

The present technology relates to a control device, a control method, a program, and a control system, and especially relates to the control device, the control method, the program, and the control system capable of improving operation of a plurality of devices.

BACKGROUND ART

As a system formed of a plurality of cameras which simultaneously takes a 360-degree image, a system which switches operation of a part of a plurality of cameras in a power-saving driving mode and operation of remaining cameras in a normal driving mode among a plurality of cameras is suggested (for example, refer to Patent Document 1).

CITATION LIST

Patent Document

Patent Document 1: Japanese Patent Application Laid-Open No. 2010-232908

SUMMARY OF THE INVENTION

Problems to be Solved by the Invention

However, the technology disclosed in Patent Document 1 does not take control according to individual situations into consideration even though this may suppress power consumption of an entire system.

The present technology is achieved in view of such a situation and an object thereof is to improve operation of a plurality of devices by the control according to the individual situations.

Solutions to Problems

A control device according to an aspect of the present technology is provided with an obtaining unit which obtains information regarding remaining operable time of each of a plurality of devices, and a setting unit which sets an operation mode of at least one device out of the plurality of devices on the basis of the information regarding remaining operable time of each of the plurality of devices.

The device has a recording function of taking a moving image to record, and the setting unit may set a recording mode of at least one device out of the plurality of devices on the basis of the information regarding remaining operable time of each of the devices which are recording.

The obtaining unit may obtain a remaining battery level of each of the plurality of devices as the information regarding remaining operable time of each of the plurality of devices, and the setting unit may calculate remaining operable time of each of the devices by using the remaining battery level of each of the devices which are recording and set the recording mode of at least one device out of the plurality of devices on the basis of the calculated remaining operable time of each of the devices.

The setting unit may calculate difference between the remaining operable time of one main device out of the plurality of devices and the remaining operable time of another device and set the recording mode of the other device according to the calculated difference.

The setting unit may calculate difference between a shorter one of the remaining operable time and remaining recording time of the one device and the remaining operable time of the other device and set the recording mode of the other device according to the calculated difference.

The setting unit may set the recording mode in which power consumption is suppressed more as the difference is larger for the other device.

The setting unit may determine the device the remaining battery level of which is the highest out of the plurality of devices as the one device.

The setting unit may determine the one device on the basis of a posture or a position of each of the devices.

The setting unit may determine the one device on the basis of a content of the moving image recorded by each of the devices.

The setting unit may dynamically determine the one device.

A display control unit which controls to display the moving image recorded by each of the devices on one display screen in real time may be further provided.

The display control unit may control to further display the remaining battery level of each of the devices on the display screen.

The display control unit may control to display the moving image recorded by the one device so as to be different from the moving image recorded by the other device.

The display control unit may control to display information indicating the recording mode set for the other device on a display area of the moving image recorded by the other device.

The display control unit may control to emphasize the display area of the moving image recorded by the other device the recording mode of which is changed.

The display control unit may control to display a warning to prompt battery replacement on a display area of the moving image recorded by the other device the remaining battery level of which reaches 0 before the remaining operable time of the one device elapses regardless of the set recording mode.

The obtaining unit may obtain remaining operable time calculated by using a remaining battery level by each of the plurality of devices as the information regarding remaining operable time of each of the plurality of devices, and the setting unit may set the recording mode of at least one device out of the plurality of devices on the basis of the obtained remaining operable time of each of the devices.

The control device has a recording function of taking a moving image to record, and the setting unit may set a recording mode of at least one device out of the plurality of devices and the control device on the basis of the remaining battery level of the control device itself and each of the devices which are recording.

A control method according to an aspect of the present technology includes steps of a control device obtaining information regarding remaining operable time of each of a plurality of devices and setting an operation mode of at least one device out of the plurality of devices on the basis of the information regarding remaining operable time of each of the plurality of devices.

A program according to an aspect of the present technology allows a computer to execute a process including steps of obtaining information regarding remaining operable time of each of a plurality of devices, and setting an operation mode of at least one device out of the plurality of devices on the basis of the information regarding remaining operable time of each of the plurality of devices.

A control system according to an aspect of the present technology is provided with a plurality of devices, and a control device including an obtaining unit which obtains information regarding remaining operable time of each of a plurality of devices, and a setting unit which sets an operation mode of at least one device out of the plurality of devices on the basis of the remaining battery level of each of the plurality of devices.

According to an aspect of the present technology, information regarding remaining operable time of each of a plurality of devices is obtained, and an operation mode of at least one device out of the plurality of devices is set on the basis of the information regarding remaining operable time of each of the plurality of devices.

Effects of the Invention

According to an aspect of the present technology, the operation of a plurality of devices may be improved by the control according to the individual situations.

BRIEF DESCRIPTION OF DRAWINGS

FIG. 11 is a view illustrating an example of a recording mode.

FIG. 15 is a view illustrating another example of the recording mode.

MODE FOR CARRYING OUT THE INVENTION

An embodiment of the present technology is hereinafter described with reference to the drawings.

<Configuration Example of Multi-View Video Recording System>

Figure 1:
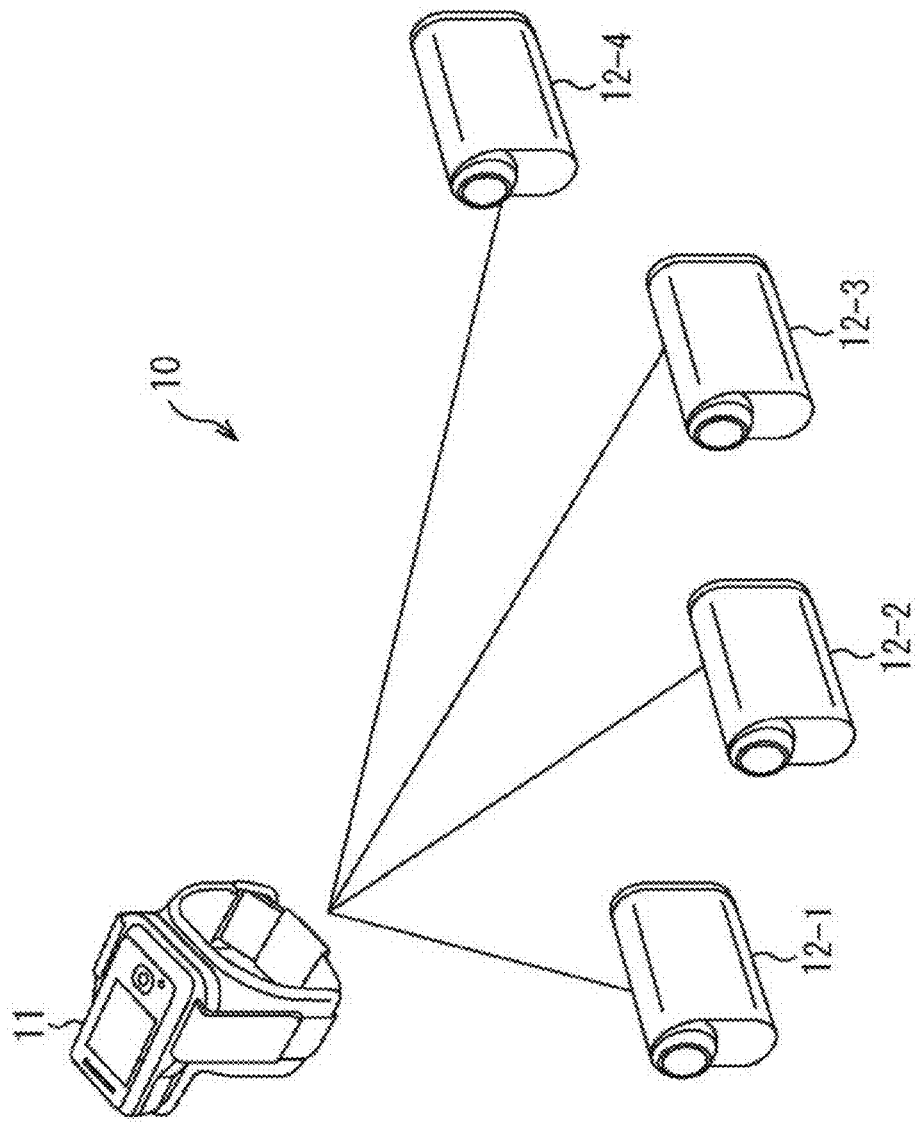
FIG. 1 is a view illustrating a configuration example of a multi-view video recording system to which the present technology is applied.

FIG. 1 illustrates a configuration example of a multi-view video recording system to which the present technology is applied.

A multi-view video recording system 10 is formed of a controller 11 as a control device of the present technology and four cameras 12-1 to 12-4. Meanwhile, in the multi-view video recording system to which the present technology is applied, the number of cameras is not limited to four.

The controller 11 configured to have a watch shape to be put on an arm and the like of a user is operated by the user to control operation of the cameras 12-1 to 12-4 by wireless communication such as Wireless Fidelity (Wi-Fi) (Registered Trademark).

Each of the cameras 12-1 to 12-4 configured to be mounted on a site of a body of the user or a portion of a bicycle which the user rides by means of a mounting member not illustrated, for example, has a recording function of taking a moving image from each viewpoint to record on the basis of control of the controller 11. Each of the cameras 12-1 to 12-4 having a built-in battery drives by using the battery as a power source.

Figure 2:
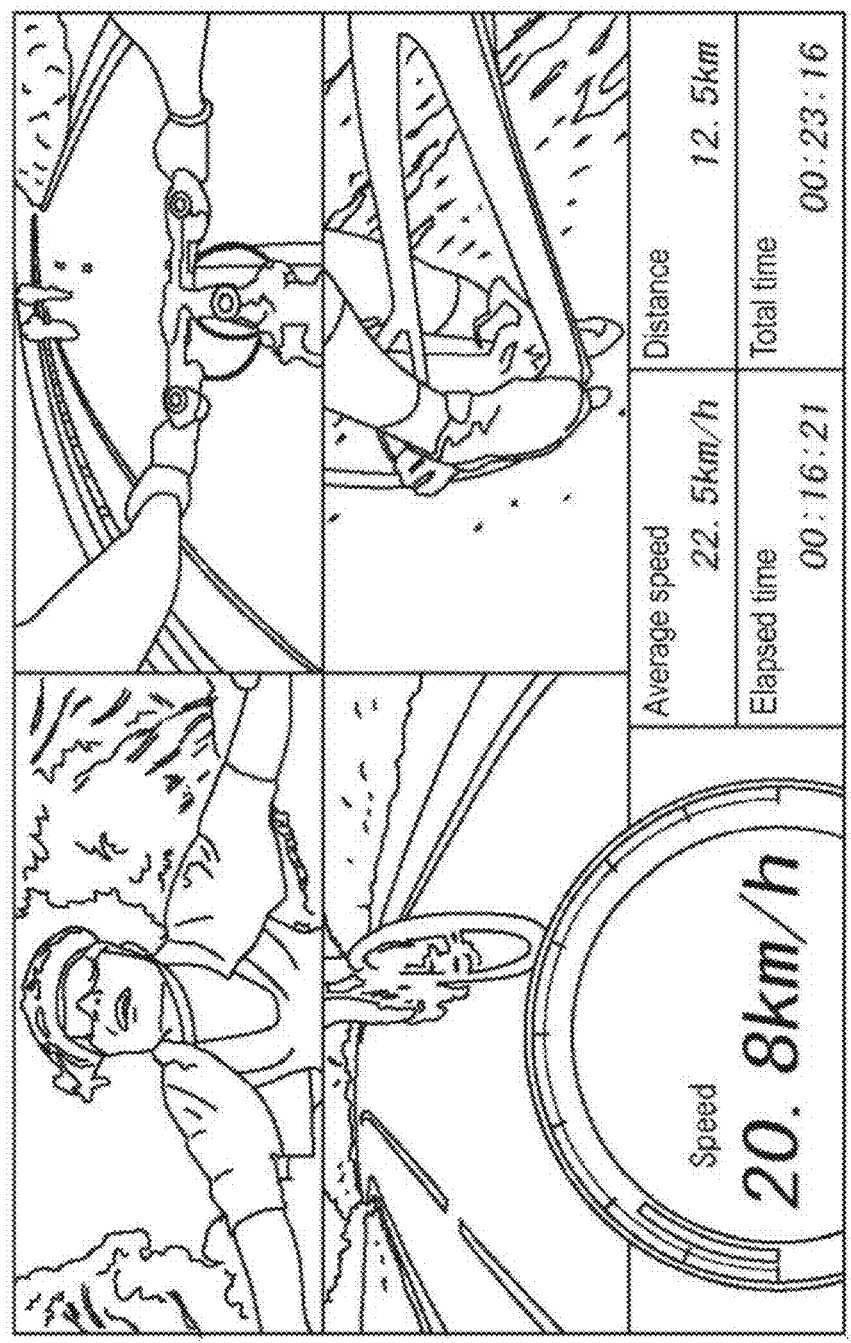
FIG. 2 is a view illustrating a display example of a multi-view video content.

The moving images simultaneously recorded by the cameras 12-1 to 12-4 are captured by a predetermined editing device, a predetermined personal computer and the like to be edited, so that one multi-view video content as illustrated in FIG. 2 is generated. Meanwhile, while the moving images are recorded by the cameras 12-1 to 12-4, the moving images and meta data thereof are transmitted from the cameras 12-1 to 12-4 to the controller 11 and the moving images are displayed on a display unit of the controller 11 in real time as live view images. Also, the meta data transmitted from the cameras 12-1 to 12-4 are displayed together with the live view images on the display unit of the controller 11 as needed.

In the multi-view video content in FIG. 2, the moving images from four viewpoints simultaneously recorded by the cameras 12-1 to 12-4 are displayed as one video. Furthermore, in a lower part of the multi-view video content in FIG. 2, in addition to a speed of the bicycle obtained as the meta data by at least any one of the cameras 12-1 to 12-4, an average speed calculated on the basis of the speed, a travel distance, elapsed time from predetermined time, and total time after starting traveling are displayed.

The cameras 12-1 to 12-4 which record the moving images serving as a base of such multi-view video content are controlled to simultaneously start recording by the controller 11; however, the operation of each of them is independent.

Figure 3:
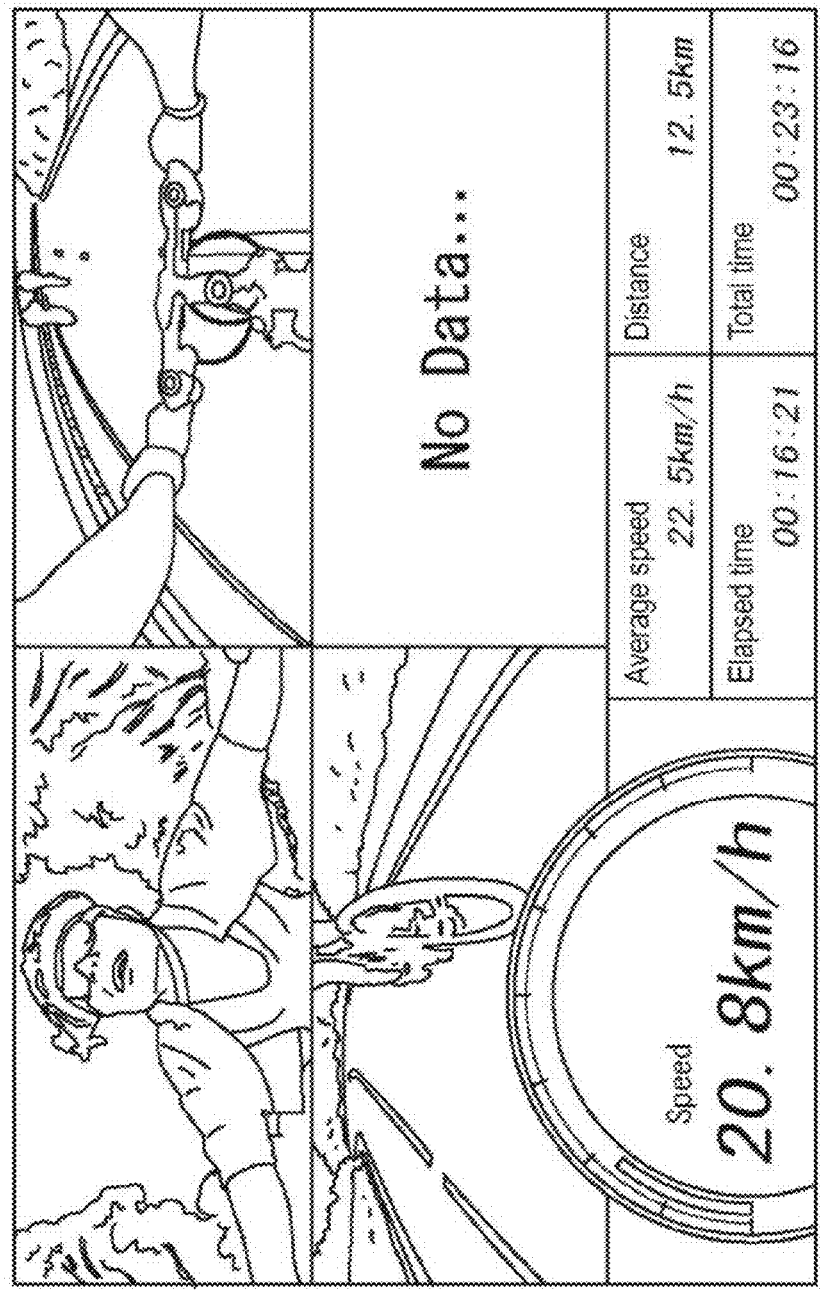
FIG. 3 is a view illustrating a display example of the multi-view video content.

Therefore, one of the cameras 12-1 to 12-4 might stop due to battery exhaustion. In such a case, in the generated multi-view video content, as illustrated in FIG. 3, for example, moving image data of the camera stopped due to the battery exhaustion is missing and a degree of perfection of the multi-view video content becomes low.

Also, when it is configured such that the moving images recorded by the cameras 12-1 to 12-4 are displayed in real time also on the display unit of the controller 11 as the live view images, there has been a demand that only the live view image of the camera used as a main camera out of the cameras 12-1 to 12-4 is checked as a high quality and high frame rate image.

Therefore, a configuration not to deteriorate the image quality and the frame rate of the live view image of the main camera while increasing the degree of perfection of the multi-view video content is hereinafter described.

<Hardware Configuration Example of Controller>

Figure 4:
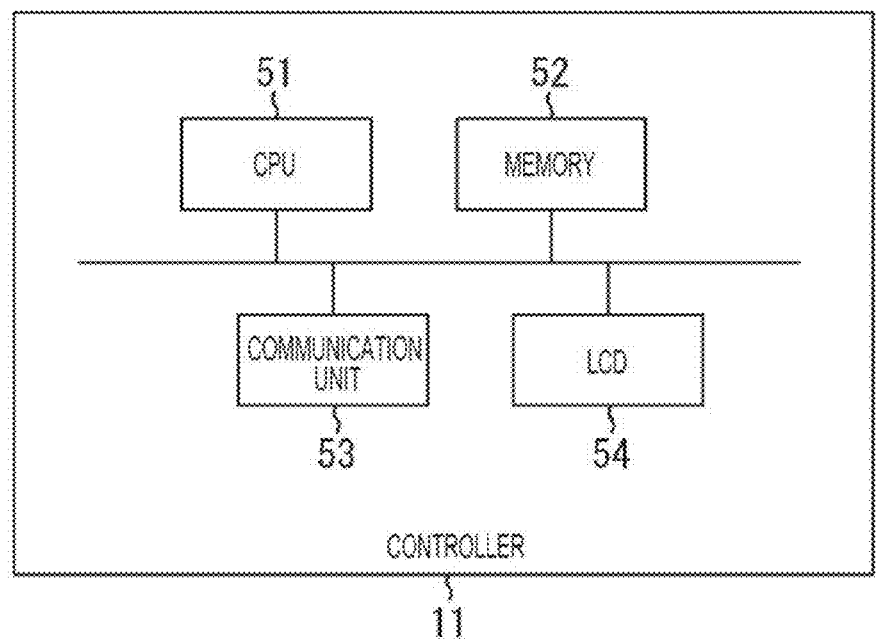
FIG. 4 is a block diagram illustrating a hardware configuration example of a controller.

FIG. 4 is a block diagram illustrating a hardware configuration example of the controller 11.

As illustrated in FIG. 4, the controller 11 includes a central processing unit (CPU) 51, a memory 52, a communication unit 53, and a liquid crystal display (LCD) 54.

The CPU 51 controls each unit of the controller 11 and generates control information for controlling each of the cameras 12-1 to 12-4.

Meanwhile, hereinafter, when it is not necessary to distinguish the cameras 12-1 to 12-4 from one another, they are simply referred to as the cameras 12.

The memory 52 temporarily stores various pieces of information supplied from the camera 12.

The communication unit 53 communicates with the camera 12 by the wireless communication such as Wi-Fi. The communication unit 53 is formed of a hardware circuit and an antenna, for example.

The LCD 54 displays the moving image taken to be recorded by each of the cameras 12 as the live view image and displays the various pieces of information supplied from the camera 12 as needed.

<Hardware Configuration Example of Camera>

Figure 5:
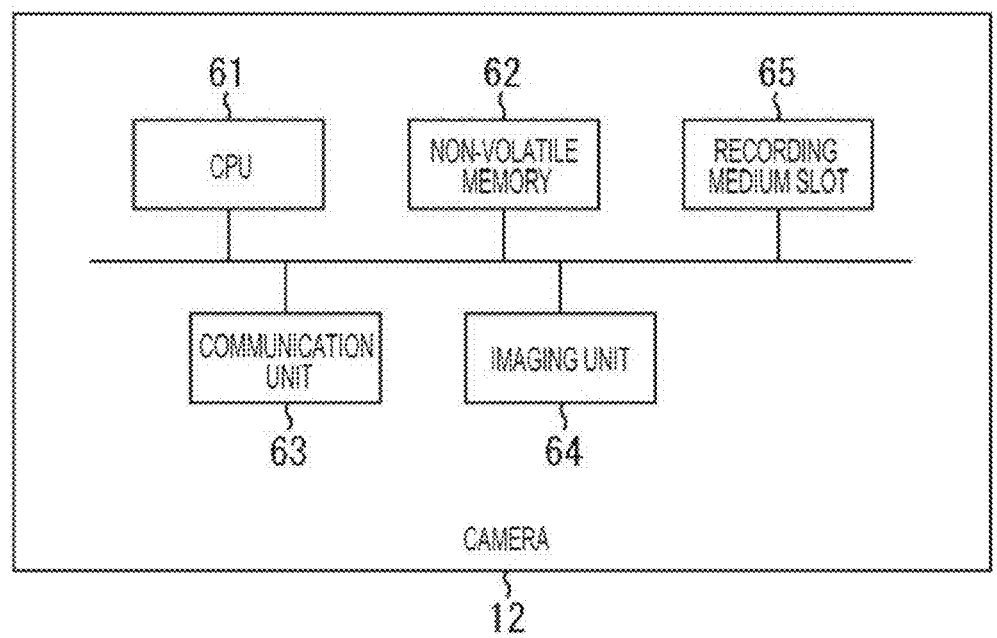
FIG. 5 is a block diagram illustrating a hardware configuration example of a camera.

FIG. 5 is a block diagram illustrating a hardware configuration example of the camera 12.

As illustrated in FIG. 5, the camera 12 includes a CPU 61, a non-volatile memory 62, a communication unit 63, an imaging unit 64, and a recording medium slot 65.

The CPU 61 controls each unit of the camera 12.

The non-volatile memory 62 stores the control information supplied from the controller 11.

The communication unit 63 communicates with the controller 11 by the wireless communication such as Wi-Fi. The communication unit 53 is formed of a hardware circuit and an antenna, for example.

The imaging unit 64 takes the moving image on the basis of the control information supplied from the controller 11. The imaging unit 64 is formed of a solid-state image sensor such as a complementary metal oxide semiconductor (CMOS) image sensor and a charge coupled device (CCD) image sensor, for example.

The recording medium slot 65 stores the moving image data obtained by imaging by the imaging unit 64 in a recording medium not illustrated mounted on the recording medium slot 65. Meanwhile, the recording medium may be removably mounted on the recording medium slot 65 or built in the camera 12.

<Function Configuration Example of Multi-View Video Recording System>

Figure 6:
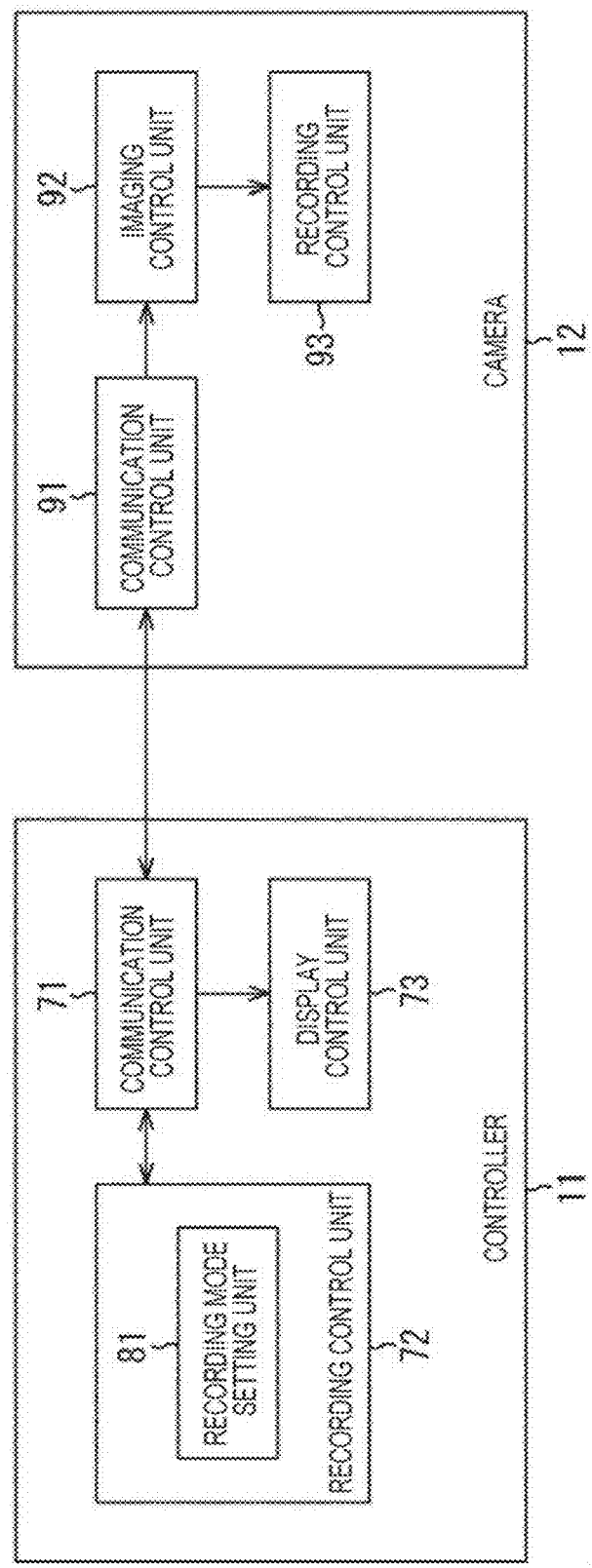
FIG. 6 is a block diagram illustrating a function configuration example of the multi-view video recording system.

Next, a function configuration example of the controller 11 and the camera 12 forming the above-described multi-view video recording system 10 is described with reference to FIG. 6. Functional blocks of the controller 11 and the camera 12 illustrated in FIG. 6 are realized by execution of a predetermined program by the CPU 51 and the CPU 61.

The controller 11 is formed of a communication control unit 71, a recording control unit 72, and a display control unit 73.

The communication control unit 71 controls the communication unit 53 to communicate with the camera 12.

The recording control unit 72 generates a command for controlling the recording of the moving image by the camera 12, thereby controlling the recording of the moving image by the camera 12. Also, the recording control unit 72 is provided with a recording mode setting unit 81 which sets a recording mode of the camera 12.

The display control unit 73 controls the display of the LCD 54.

Also, the camera 12 is formed of a communication control unit 91, an imaging control unit 92, and a recording control unit 93.

The communication control unit 91 controls the communication unit 63 to communicate with the controller 11.

The imaging control unit 92 controls the imaging of the moving image by the imaging unit 64 on the basis of the command from the controller 11.

The recording control unit 93 controls storage (recording) of the moving image data obtained by the imaging by the imaging unit 64 in the recording medium not illustrated through the recording medium slot 65.

<Flow of Recording Process in Multi-View Video Recording System>

Figure 7:
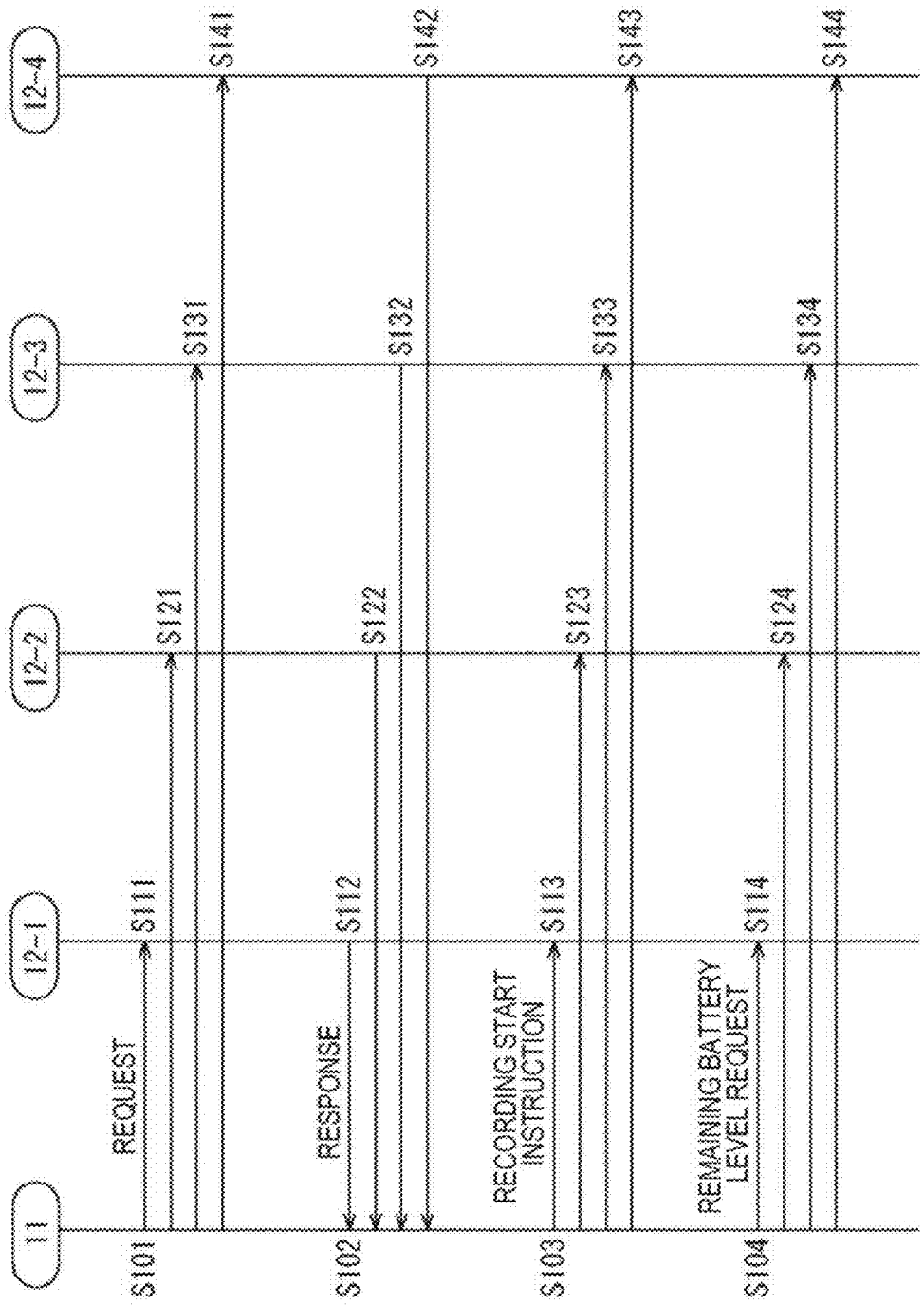
FIG. 7 is a flowchart illustrating a recording process of multi-view video.
Figure 8:
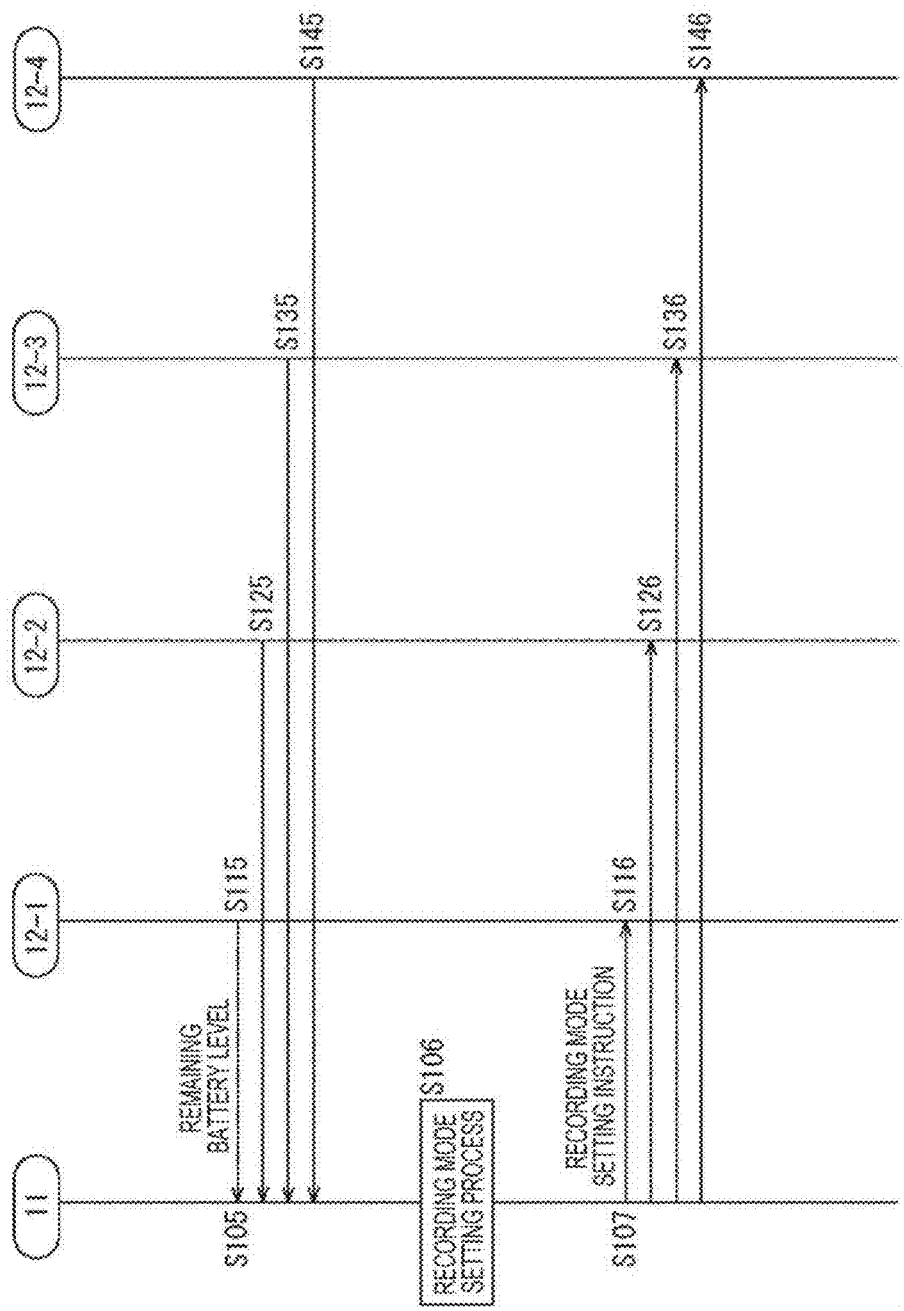
FIG. 8 is a flowchart illustrating the recording process of the multi-view video.

A flow of a recording process in the multi-view video recording system 10 is next described with reference to FIGS. 7 and 8.

First, the communication control unit 71 of the controller 11 controls the communication unit 53, thereby transmitting a communication request to each of the cameras 12-1 to 12-4 at step S101.

The communication control unit 91 of each of the cameras 12-1 to 12-4 controls the communication unit 63, thereby receiving the communication request from the controller 11 at steps S111, S121, S131, and S141.

Furthermore, the communication control unit 91 of each of the cameras 12-1 to 12-4 controls the communication unit 63, thereby transmitting a response indicating that the communication may be performed in response to the communication request from the controller 11 at steps S112, S122, S132, and S142.

The communication control unit 71 of the controller 11 controls the communication unit 53, thereby receiving the response from each of the cameras 12-1 to 12-4 at step S102.

The communication between the controller 11 and the cameras 12-1 to 12-4 is established in this manner, and when the recording control unit 72 of the controller 11 generates a command for instructing the cameras 12-1 to 12-4 to start recording, the communication control unit 71 controls the communication unit 53, thereby transmitting a recording start instruction command to each of the cameras 12-1 to 12-4 at step S103.

The communication control unit 91 of each of the cameras 12-1 to 12-4 controls the communication unit 63, thereby receiving the recording start instruction command from the controller 11 at steps S113, S123, S133, and S143.

In response to the recording start instruction command from the controller 11, the imaging control unit 92 of each of the cameras 12-1 to 12-4 controls the imaging unit 64, thereby starting taking the moving image and the recording control unit 93 starts recording the taken moving image in the recording medium not illustrated through the recording medium slot 65. That is to say, the cameras 12-1 to 12-4 start recording the moving images.

Thereafter, when the recording control unit 72 of the controller 11 generates a command for requesting a remaining battery level from each of the cameras 12-1 to 12-4 as information regarding remaining operable time of each of them at predetermined timing, the communication control unit 71 controls the communication unit 53, thereby transmitting a remaining battery level request command to each of the cameras 12-1 to 12-4 at step S104.

The communication control unit 91 of each of the cameras 12-1 to 12-4 controls the communication unit 63, thereby receiving the remaining battery level request command from the controller 11 at steps S114, S124, S134, and S144.

Furthermore, the communication control unit 91 of each of the cameras 12-1 to 12-4 controls the communication unit 63, thereby transmitting information indicating the remaining battery level in response to the remaining battery level request command from the controller 11 at steps S115, S125, S135, and S145.

When the communication control unit 71 of the controller 11 controls the communication unit 53, thereby receiving the information indicating the remaining battery level from each of the cameras 12-1 to 12-4 at step S105, the recording mode setting unit 81 executes a recording mode setting process at step S106. The recording mote setting process will be described later in detail.

At step S106, when the recording mode of each of the cameras 12-1 to 12-4 is set, the communication control unit 71 of the controller 11 controls the communication unit 53, thereby transmitting a recording mode setting instruction command to each of the cameras 12-1 to 12-4 at step S107.

The communication control unit 91 of each of the cameras 12-1 to 12-4 controls the communication unit 63, thereby receiving the recording mode setting instruction command from the controller 11 at steps S116, S126, S136, and S146.

Then, the cameras 12-1 to 12-4 record in the recording mode the setting of which is indicated on the basis of the recording mode setting instruction command from the controller 11.

As described above, the controller 11 obtains the information indicating the remaining battery level of each of the cameras 12-1 to 12-4 and sets the recording modes of the cameras 12-1 to 12-4 on the basis of the obtained information indicating the remaining battery level of each of the cameras 12-1 to 12-4. Herein, "obtaining the information" is intended to mean a process including actively transmitting a request including a command to transmit information to an external device such as a camera and obtaining the information received in response to the request, obtaining the information subjectively transmitted by the external device, receiving the received information as a data input and the like, for example.

Meanwhile, the processes at steps S104 to S107 by the controller 11 are repeated every predetermined time and the recording modes of the cameras 12-1 to 12-4 are set every predetermined time.

<Detail of Recording Mode Setting Process>

Next, the recording mode setting process executed by the controller 11 at step S106 of the above-described recording process is described in detail with reference to FIG. 9.

First, at step S211, the recording control unit 72 obtains the information indicating the remaining battery level transmitted as the information regarding the remaining operable time from each of the cameras 12-1 to 12-4.

At step S212, the recording mode setting unit 81 calculates the remaining operable time of each of the cameras 12-1 to 12-4 by using the remaining battery levels of each of the cameras 12-1 to 12-4.

Specifically, the recording mode setting unit 81 calculates the remaining operable time of each of the cameras 12-1 to 12-4 by using a remaining battery level B(t) obtained at current time t and a remaining battery level B(t-Δt) obtained predetermined time Δt ago.

At step S213, the recording mode setting unit 81 recognizes one of the cameras 12-1 to 12-4 as a main camera and calculates difference between the remaining operable time of the main camera and the remaining operable time of a sub camera other than the main camera. Meanwhile, the main camera is determined in advance. The camera which records the moving image to which the user places the greatest importance among the moving images recorded by the cameras 12-1 to 12-4, for example, serves as the main camera.

Then, at step S214, the recording mode setting unit 81 sets the recording mode of each of the sub cameras on the basis of the calculated difference.

In this embodiment, the above-described process is executed every predetermined time Δt and the recording mode is set every predetermined time Δt.

Herein, relationship between the remaining battery level and the remaining operable time is described with reference to FIG. 10.

Figure 10:
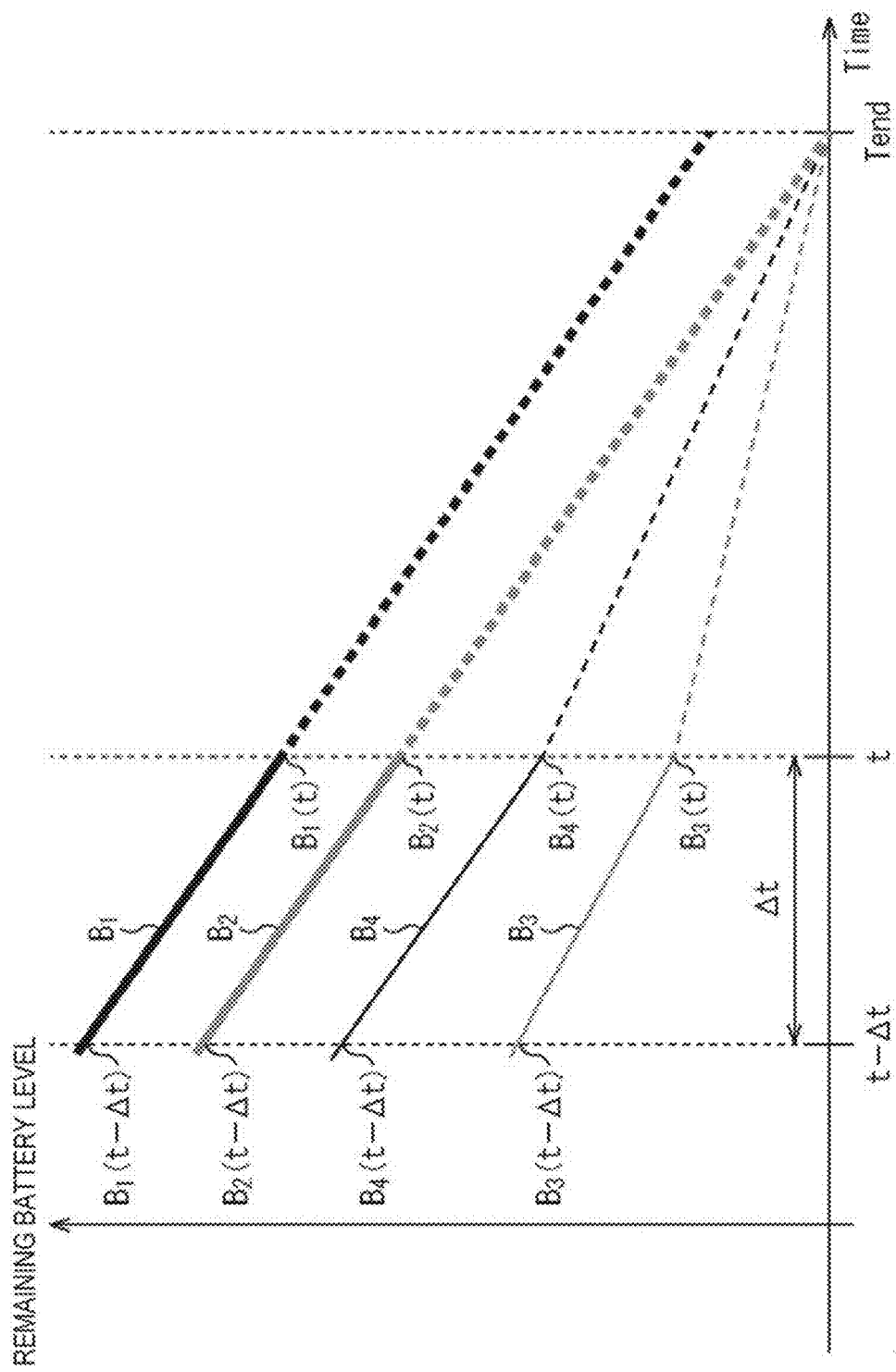
FIG. 10 is a view illustrating relationship between a remaining battery level and remaining operable time.

In FIG. 10, time and the remaining battery level at each time are plotted along the abscissa and the ordinate, respectively. Also, graphs B1, B2, B3, and B4 illustrated in FIG. 10 indicate the remaining battery levels of the cameras 12-1 to 12-4, respectively.

Meanwhile, the camera 12-2 out of the cameras 12-1 to 12-4 herein serves as the main camera, and the cameras 12-1 to 12-4 perform recording operation in the same recording mode in an initial state.

First, the remaining operable time of the camera 12-2 is calculated on the basis of a remaining battery level B2($t$) at the time t and a remaining battery level B2($t$-Δt) at time Δt of the camera 12-2 serving as the main camera. As illustrated in FIG. 10, the camera 12-2 may be driven until time Tend.

Remaining battery levels B3 and B4 of the cameras 12-3 and 12-4, respectively, out of the sub cameras are lower than the remaining battery level B2 of the camera 12-2 serving as the main camera, so that the remaining operable time of each of them calculated at time t is naturally shorter than that of the main camera.

Therefore, when the remaining operable time of the sub camera is shorter than the remaining operable time of the main camera, the recording mode is set (changed) such that the remaining operable time of the sub camera becomes equal to the remaining operable time of the main camera in accordance with the difference. Specifically, the recording mode is set such that power consumption of the sub camera is suppressed more as the difference is larger. According to this, as illustrated in FIG. 10, the cameras 12-3 and 12-4 may also be driven until the time Tend.

FIG. 11 illustrates an example of the recording mode set according to the difference in the remaining operable time.

As illustrated in FIG. 11, when the difference in the remaining operable time is 0 to 14 minutes, the recording mode is not changed, and when this is 15 to 29 minutes, an upper limit of a transfer rate of the live view image transferred from the camera 12 to the controller 11 as the recording mode is changed to 45 frame per second (fps). Meanwhile, the upper limit of the transfer rate of the live view image is set to 60 fps as the recording mode in the initial state.

Also, when the difference in the remaining operable time is 30 to 44 minutes, the upper limit of the transfer rate of the live view image is changed to 30 fps, and when this is 45 to 59 minutes, the upper limit of the transfer rate of the live view image is changed to 15 fps.

Furthermore, when the difference in the remaining operable time is not shorter than 60 minutes, the live view image is not transferred from the camera 12 to the controller 11. Meanwhile, in this case also, the sub camera records the moving image.

Meanwhile, a remaining battery level B1 of the camera 12-1 out of the sub cameras is higher than the remaining battery level B2 of the camera 12-2 serving as the main camera, so that the remaining operable time thereof calculated at the time t is longer than that of the main camera. Therefore, the recording mode is not changed.

Figure 12:
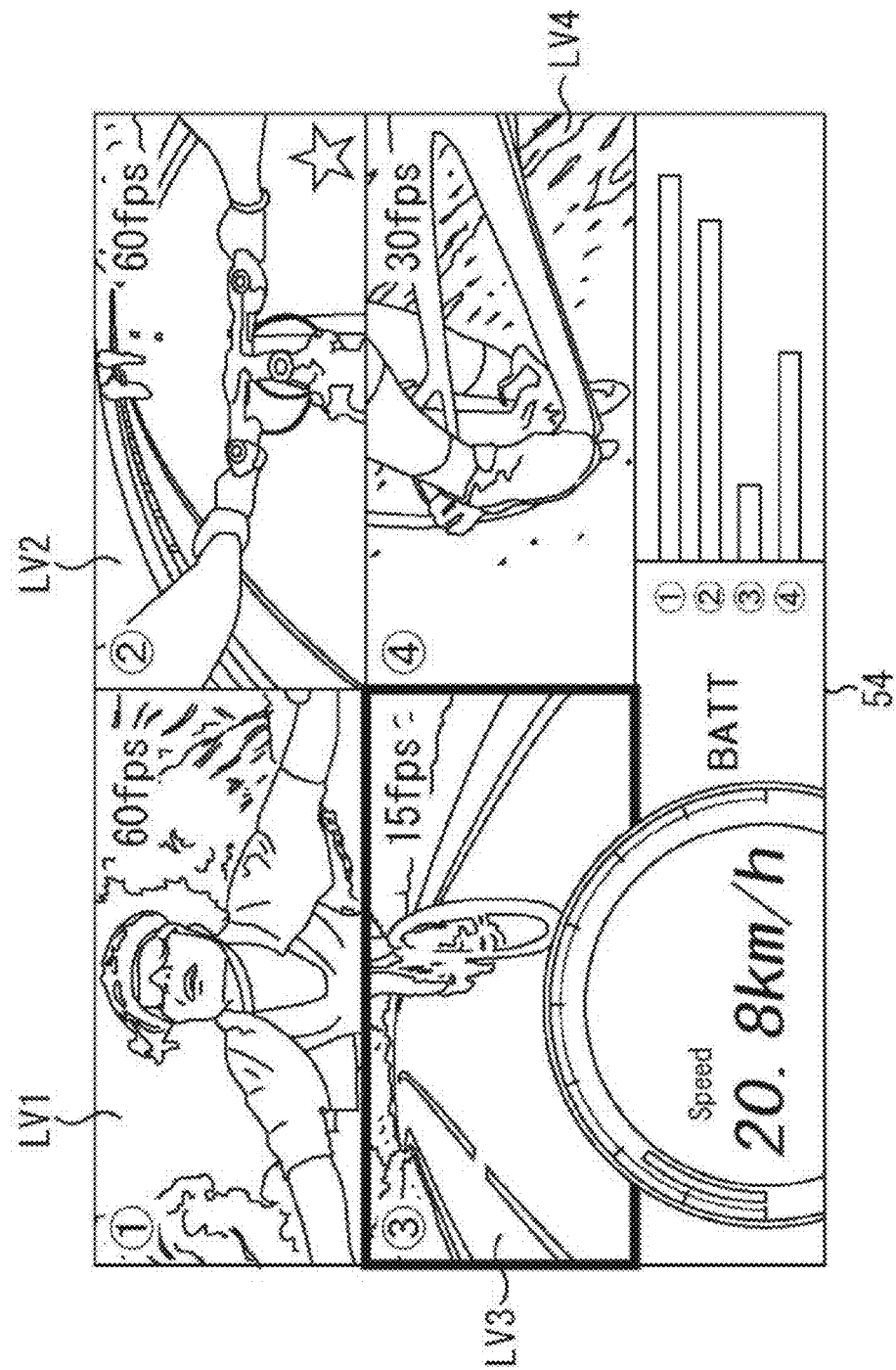
FIG. 12 is a view illustrating a display example of an LCD of the controller.

FIG. 12 illustrates a display example of the LCD 54 of the controller 11 at the time t.

As illustrated in FIG. 12, the moving images recorded by the cameras 12-1 to 12-4 are transmitted from the cameras 12-1 to 12-4 to the controller 11 to be displayed on the LCD 54 in real time as the live view images.

In FIG. 12, a live view image LV1 with a number 1 assigned in an upper left part is the moving image recorded by the camera 12-1, a live view image LV2 with a number 2 assigned in an upper left part is the moving image recorded by the camera 12-2, a live view image LV3 with a number 3 assigned in an upper left part is the moving image recorded by the camera 12-3, and a live view image LV4 with a number 4 assigned in an upper left part is the moving image recorded by the camera 12-4.

A star-shaped icon is displayed in a lower right part of the live view image LV2 such that the user may recognize that the live view image LV2 is the moving image recorded by the main camera. In addition to displaying such icon for indicating that this is the live view image corresponding to the main camera in this manner, it is possible to display the same so as to be different from the live view image corresponding to the sub camera.

Also, a numeric value indicating the upper limit of the transfer rate of the live view image transferred from the camera 12 to the controller 11 is displayed as the recording mode set for each of the cameras 12-1 to 12-4 in the upper right part of each of the live view images LV1 to LV4.

Specifically, the numeric value of 60 fps is displayed as the upper limit of the transfer rate of the live view image transferred from the camera 12-1 to the controller 11 in the upper right part of the live view image LV1, the numeric value of 60 fps is displayed as the upper limit of the transfer rate of the live view image transferred from the camera 12-2 to the controller 11 in the upper right part of the live view image LV2, the numeric value of 15 fps is displayed as the upper limit of the transfer rate of the live view image transferred from the camera 12-3 to the controller 11 in the upper right part of the live view image LV3, and the numeric value of 30 fps is displayed as the upper limit of the transfer rate of the live view image transferred from the camera 12-4 to the controller 11 in the upper right part of the live view image LV4.

Furthermore, the speed obtained as the meta data by at least any one of the cameras 12-1 to 12-4 and the bar graph indicating the remaining battery level obtained as the information regarding the remaining operable time of each of the cameras 12-1 to 12-4 are displayed below the live view images LV1 to LV4 on the LCD 54. The speed obtained as the meta data by at least any one of the cameras 12-1 to 12-4 is transmitted to the controller 11 to be displayed on the LCD 54 of the controller 11.

Specifically, the bar graph corresponding to the number 1 indicates the remaining battery level of the camera 12-1, the bar graph corresponding to the number 2 indicates the remaining battery level of the camera 12-2, the bar graph corresponding to the number 3 indicates the remaining battery level of the camera 12-3, and the bar graph corresponding to the number 4 indicates the remaining battery level of the camera 12-4. Herein, it is illustrated that the remaining battery level of the camera 12-3 is the lowest as described with reference to FIG. 10.

Meanwhile, as in the case of the camera 12-3, when the remaining battery level is low, the difference between the remaining operable time thereof and the remaining operable time of the main camera is large, and the recording mode is set (changed) to significantly suppress the power consumption, it is also possible that a display area of the moving image recorded by the sub camera is emphasized. In the example in FIG. 12, the display area of the live view image LV3 corresponding to the moving image recorded by the camera 12-3 is enclosed by a frame to be emphasized.

Figure 13:
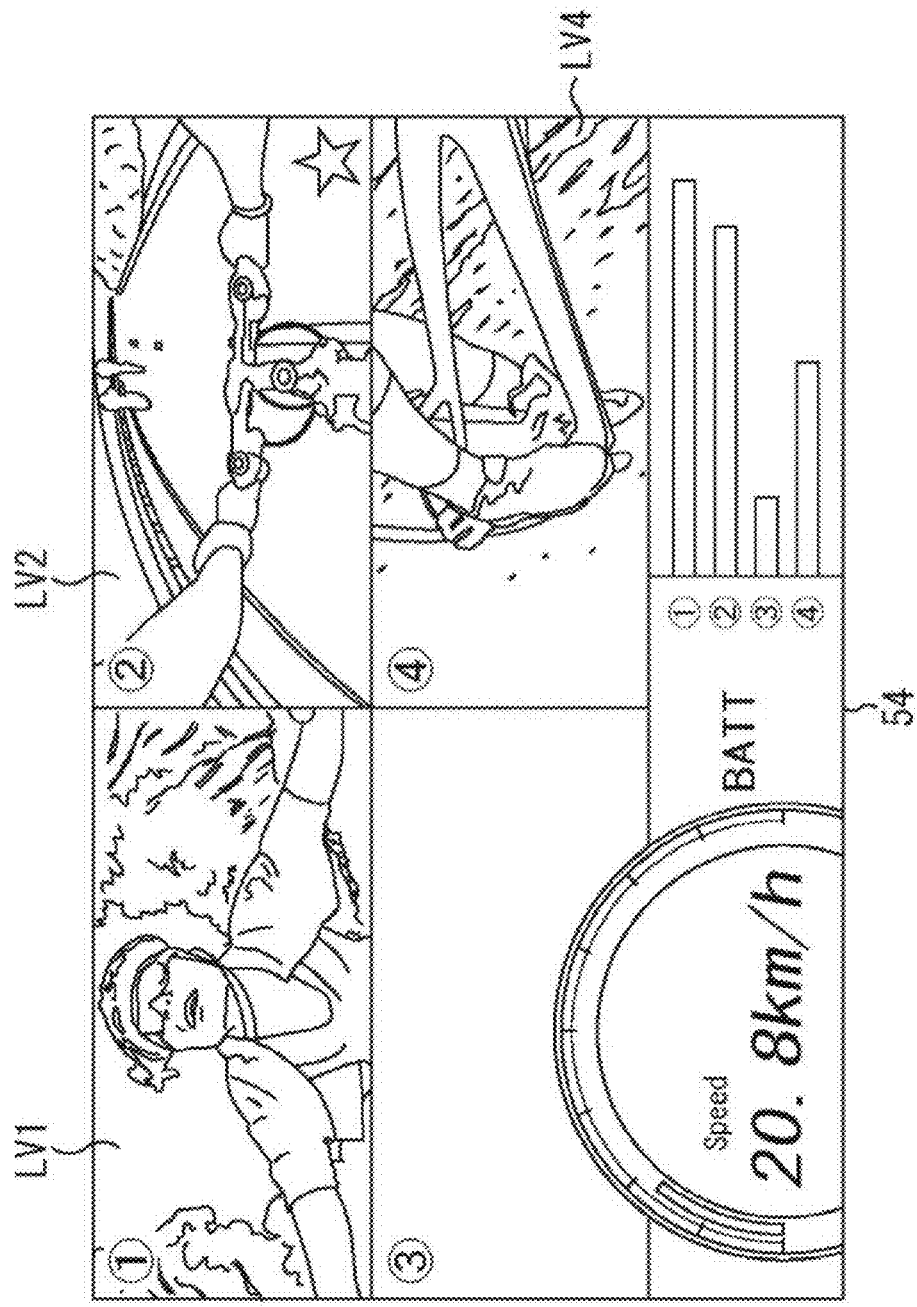
FIG. 13 is a view illustrating the display example of the LCD of the controller.

Also, when the difference in the remaining operable time is larger, the live view image is not transferred from the camera 12 to the controller 11, so that the moving image recorded by the sub camera is not displayed. Specifically, as illustrated in FIG. 13, the live view image LV3 corresponding to the moving image recorded by the camera 12-3 is not displayed.

As described above, the recording mode of the sub camera is set such that the battery of the sub camera is not exhausted before that of the main camera is exhausted, so that the moving image data of any camera is not missing in the generated multi-view video content and it becomes possible to more certainly increase the degree of perfection of the multi-view video content.

Also, since the recording mode of the sub camera is set on the basis of the main camera, the image quality and the frame rate of the live view image of the main camera are not deteriorated.

<Example of Determining Method of Main Camera>

Although the main camera is determined in advance in the description above, it is also possible that the camera 12 selected by predetermined user operation is determined as the main camera or the camera 12 the remaining battery level of which is the highest is determined as the main camera, for example.

Also, the main camera may be determined on the basis of a posture and a position of each of the cameras 12.

For example, when a plurality of cameras 12 is mounted on the sites of the body of the user or the positions of the bicycle which the user rides, the camera 12 which takes an image in a travel direction of the bicycle is determined as the main camera. This is realized by the CPU 51 of the controller 11, for example, determining the main camera on the basis of data obtained by a global positioning system (GPS) transmitter and an acceleration sensor mounted on each of the cameras 12.

Also, when each of a plurality of users puts the camera 12 on, the camera 12 located in a position the closest to the controller 11 is determined as the main camera. This is realized by using radio field strength of Wi-Fi used in the communication between the controller 11 and the camera 12 and GPS information of the camera 12.

Furthermore, it is also possible that the main camera is determined on the basis of a content of the moving image recorded by each of a plurality of cameras 12. Specifically, the main camera is determined by a feature amount obtained by performing image recognition processing and the like on the moving image recorded by each of the cameras 12.

Meanwhile, the posture and the position of the camera 12 and the content of the moving image recorded by each of the cameras 12 described above change over time, so that it is also possible that the main camera is dynamically determined according to the change.

Figure 14:
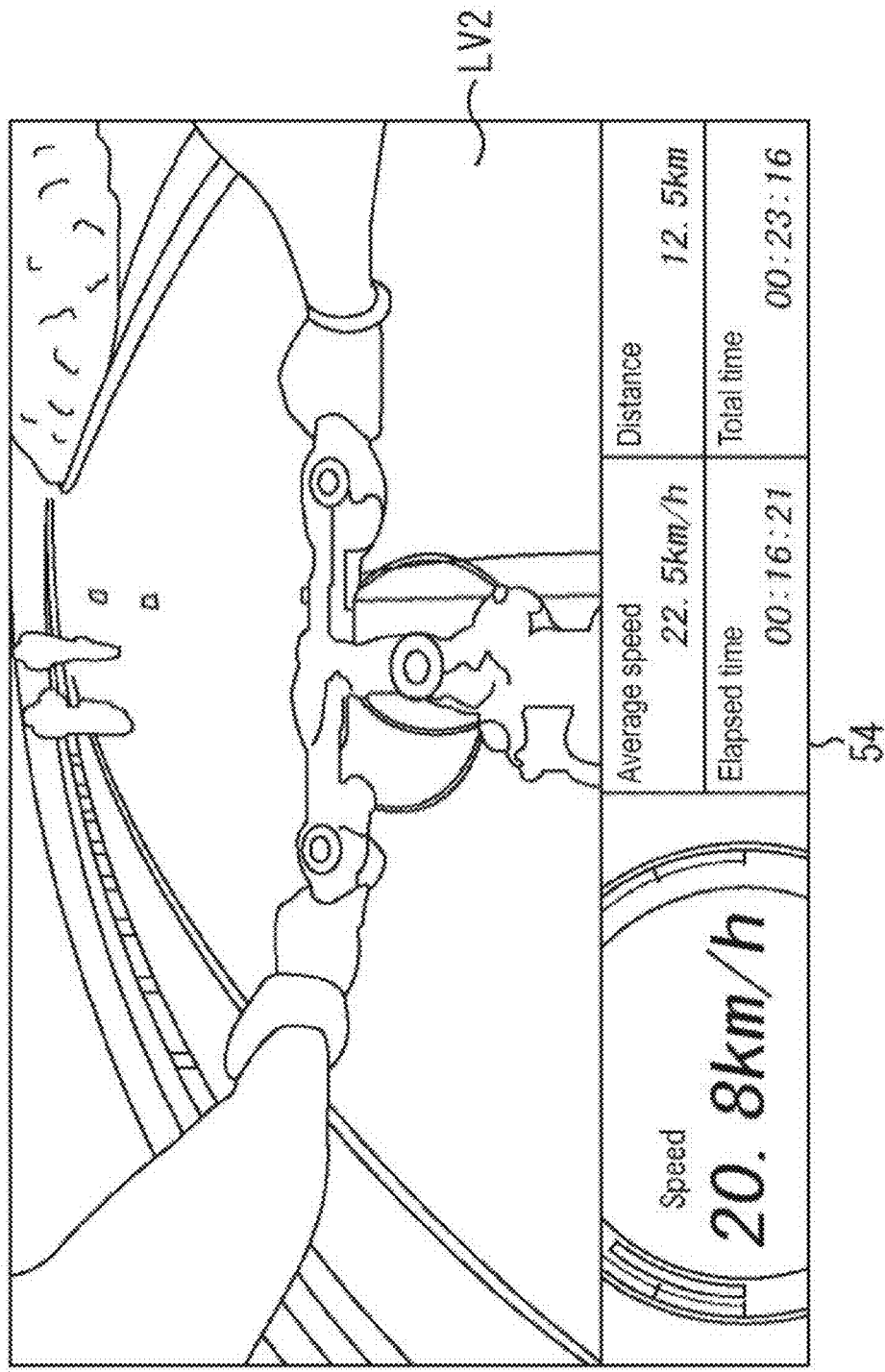
FIG. 14 is a view illustrating the display example of the LCD of the controller.

Also, although the icon is displayed on the live view image corresponding to the main camera in order for the user to recognize that this is the moving image recorded by the main camera in the description above, it is also possible to display the live view image LV2 corresponding to the main camera on an entire display area of the live view image as illustrated in FIG. 14 or simply not to display the live view image corresponding to the sub camera in the display example illustrated in FIG. 12.

<Another Example of Recording Mode>

Although the upper limit of the transfer rate of the live view image transferred from the camera 12 to the controller 11 is changed as the recording mode according to the difference in the remaining operable time in the above-described example, it is also possible that the recording mode is set such that another function of the camera 12 is limited.

FIG. 15 illustrates another example of the recording mode set according to the difference in the remaining operable time.

As illustrated in FIG. 15, when the difference in the remaining operable time is 0 to 14 minutes, the recording mode is not changed, and when this is 15 to 29 minutes, audio recording by the camera 12 is stopped.

Also, when the difference in the remaining operable time is 30 to 44 minutes and 45 to 59 minutes, the audio recording and meta data recording by the camera 12 are stopped.

Furthermore, when the difference in the remaining operable time is not shorter than 60 minutes, the audio recording and the meta data recording by the camera 12 are stopped and recording image quality is decreased by one level.

Figure 16:
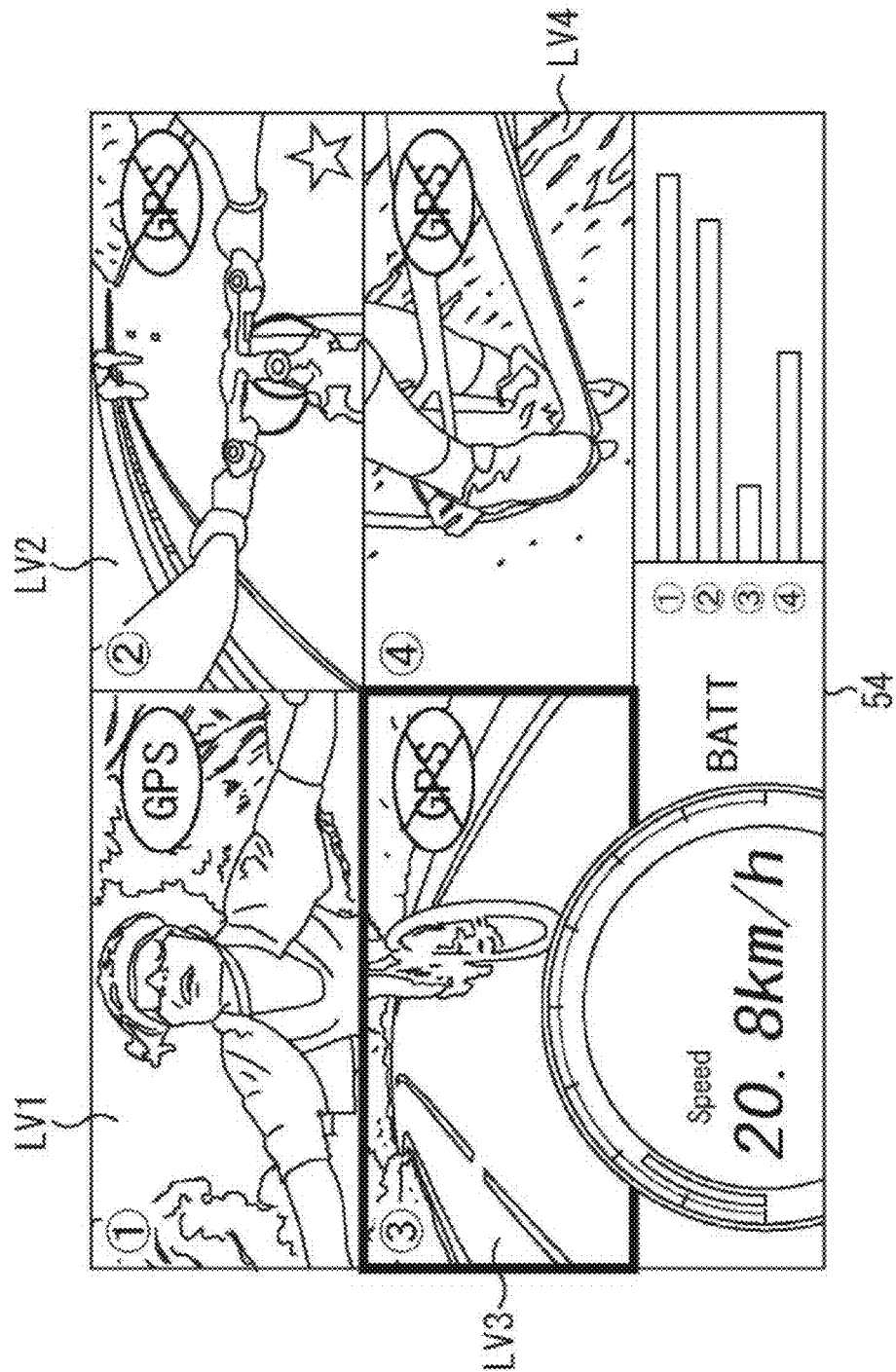
FIG. 16 is a view illustrating the display example of the LCD of the controller.

FIG. 16 illustrates another display example of the LCD 54 of the controller 11.

In the example in FIG. 16, an icon indicating whether the GPS information is recorded as the meta data is displayed as the recording mode set for each of the cameras 12-1 to 12-4 in the upper right part of each of the live view images LV1 to LV4.

Specifically, the icon indicating that the camera 12-1 is recording the GPS information is displayed in the upper right part of the live view image LV1 and the icon indicating that each of the cameras 12-2 to 12-4 is not recording the GPS information is displayed in the upper right part of each of the live view images LV2, LV3, and LV4.

That is to say, in this example, only the camera 12-1 out of the cameras 12-1 to 12-4 records the GPS information even though this is the sub camera. Meanwhile, the cameras 12-2 to 12-4 do not record the GPS information nor record the audio.

When the cameras 12-1 to 12-4 are mounted on one user or one bicycle, audio data and positional information recorded by the respective cameras 12 are substantially the same. Therefore, as in the example in FIG. 16, the cameras 12-2 to 12-4 other than the camera 12-1 the remaining battery level of which is the highest stop recording the audio data and the positional information, so that they may record only the moving images while suppressing the power consumption.

As a result, the moving image data of any camera is not missing in the generated multi-view video content, and it becomes possible to more certainly increase the degree of perfection of the multi-view video content.

Meanwhile, when the remaining battery level of the sub camera is extremely low and the remaining battery level of the sub camera reaches 0 before the remaining operable time of the main camera elapses regardless of the recording mode set for the sub camera, a warning to prompt battery replacement may be displayed on the display area of the live view image corresponding to the sub camera on the LCD 54 of the controller 11.

Figure 17:
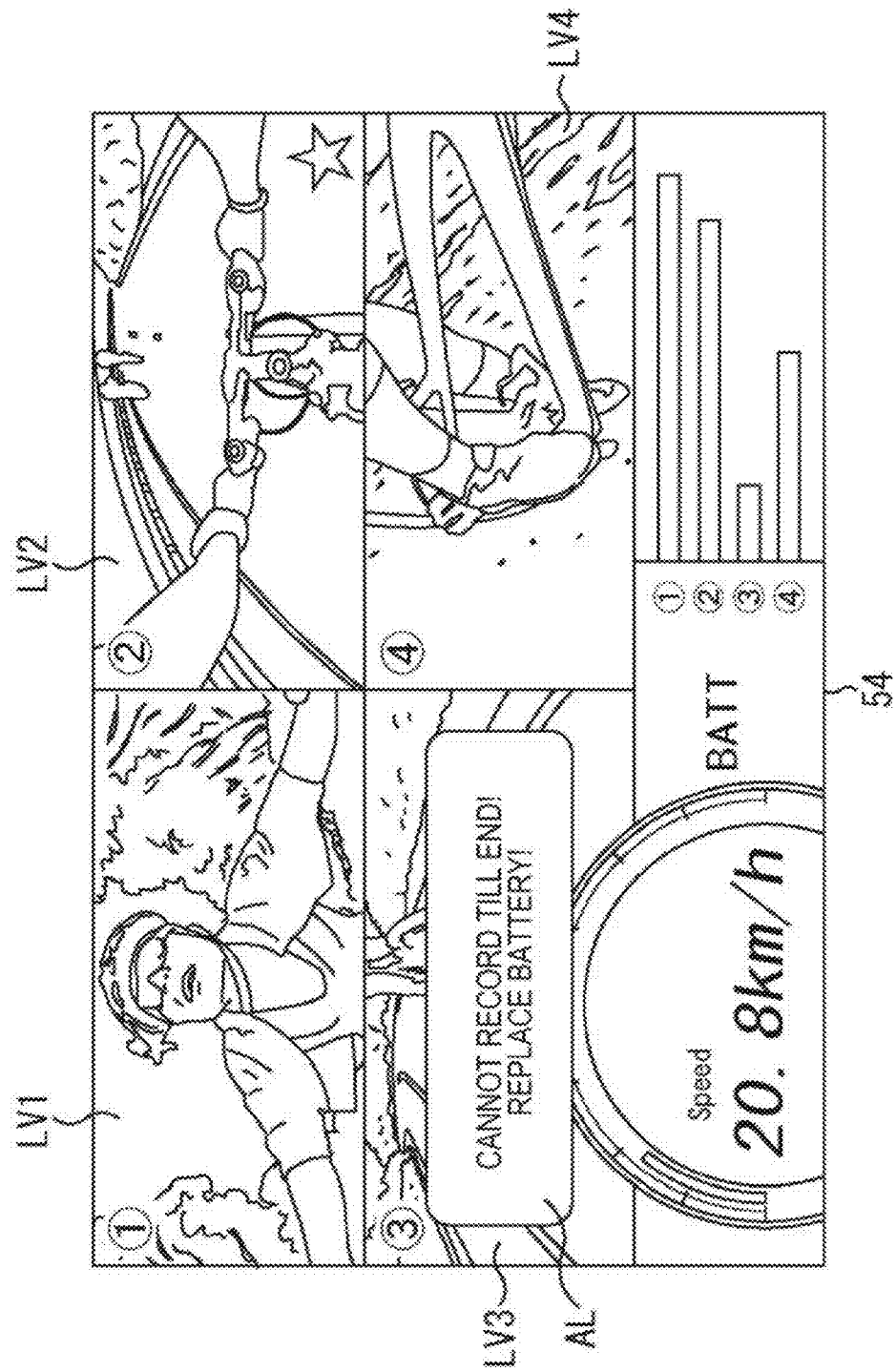
FIG. 17 is a view illustrating the display example of the LCD of the controller.

Specifically, as illustrated in FIG. 17, an alarm display AL including a message such as "Cannot record till the end. Replace the battery!" is displayed on the display area of the live view image LV3 corresponding to the camera 12-3 the remaining battery level of which is extremely low on the LCD 54.

According to this, it is possible to prompt the user to replace the battery of the camera the remaining battery level of which is low before the battery is exhausted, and as a result, the moving image data of any camera is not missing in the generated multi-view video content.

Meanwhile, it is also possible that a message announcing how much earlier than the end of the remaining operable time of the main camera the remaining battery level reaches 0 such as "Battery will be exhausted 30 minutes earlier than the battery of the main camera!" is displayed, for example, in place of the alarm display AL in the example in FIG. 17.

Although the recording mode of the sub camera is set on the basis of the remaining operable time of the main camera in the description above, it is also possible that the recording mode of the sub camera is set on the basis of remaining recording time when recording time of the moving image serving as the base of the multi-view video content is determined in advance.

<Another Example of Recording Mode Setting Process>

Then, the recording mode setting process based on the remaining recording time is described with reference to FIG. 18.

Figure 9:
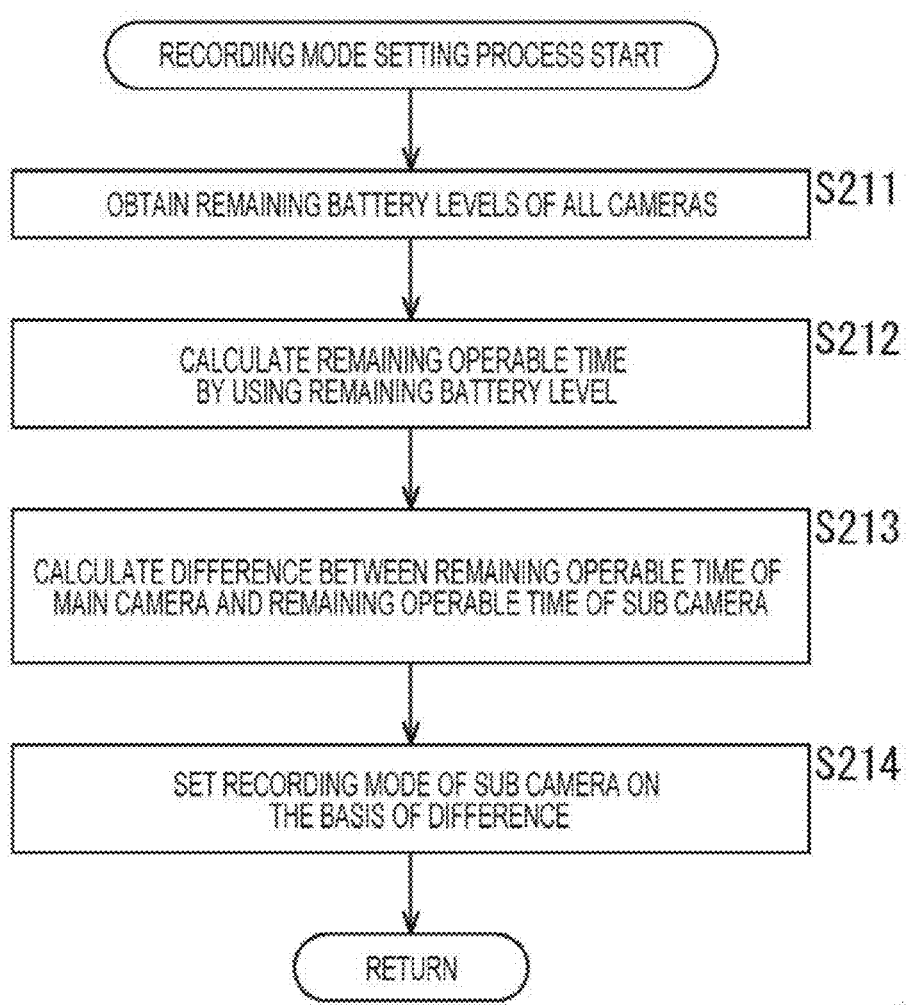
FIG. 9 is a flowchart illustrating an example of a recording mode setting process.
Figure 18:
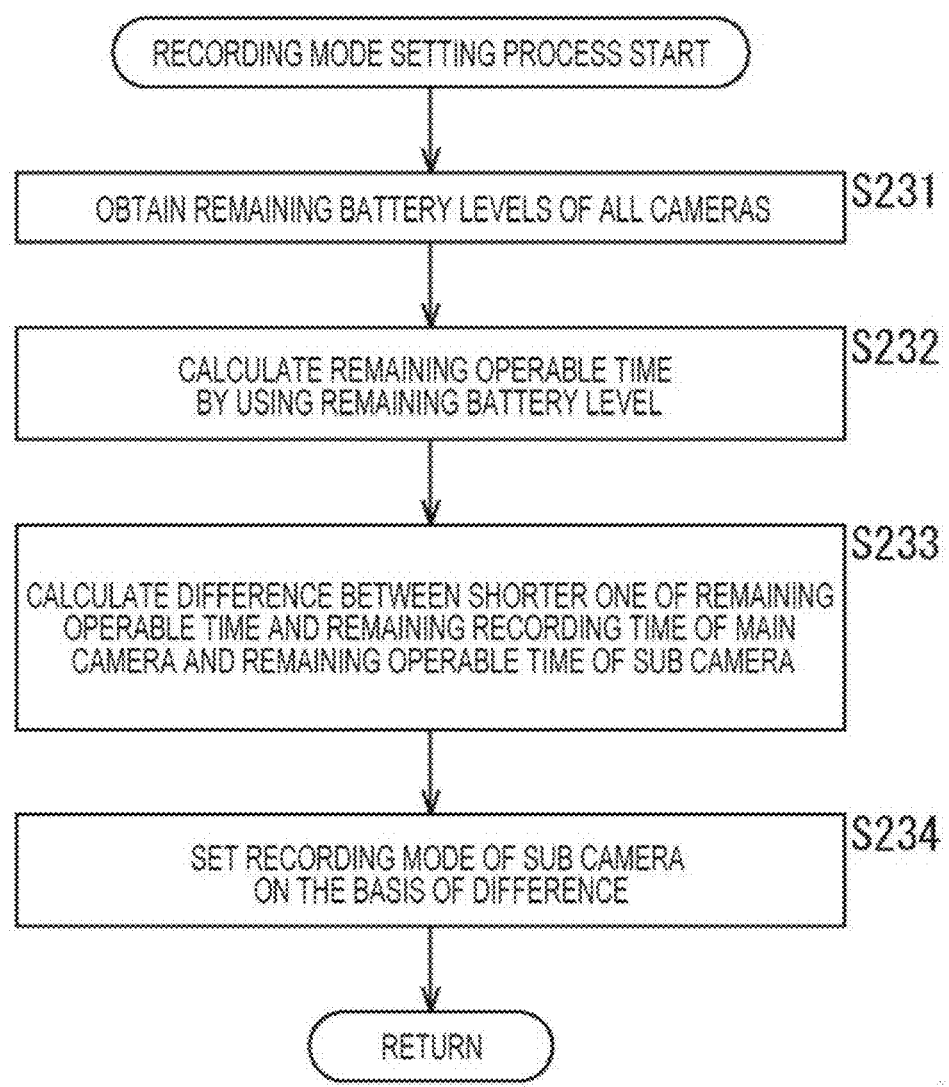
FIG. 18 is a flowchart illustrating another example of the recording mode setting process.

Meanwhile, processes at steps S231, S232, and S234 of a flowchart in FIG. 18 are similar to those at S211, S212, and S214 of the flowchart in FIG. 9, so that the description thereof is omitted.

That is to say, at step S233, the recording mode setting unit 81 calculates difference between a shorter one of the remaining operable time and the remaining recording time of the main camera and the remaining operable time of the sub camera being the camera other than the main camera. The remaining recording time is time until recording end time specified by the user, for example.

Figure 19:
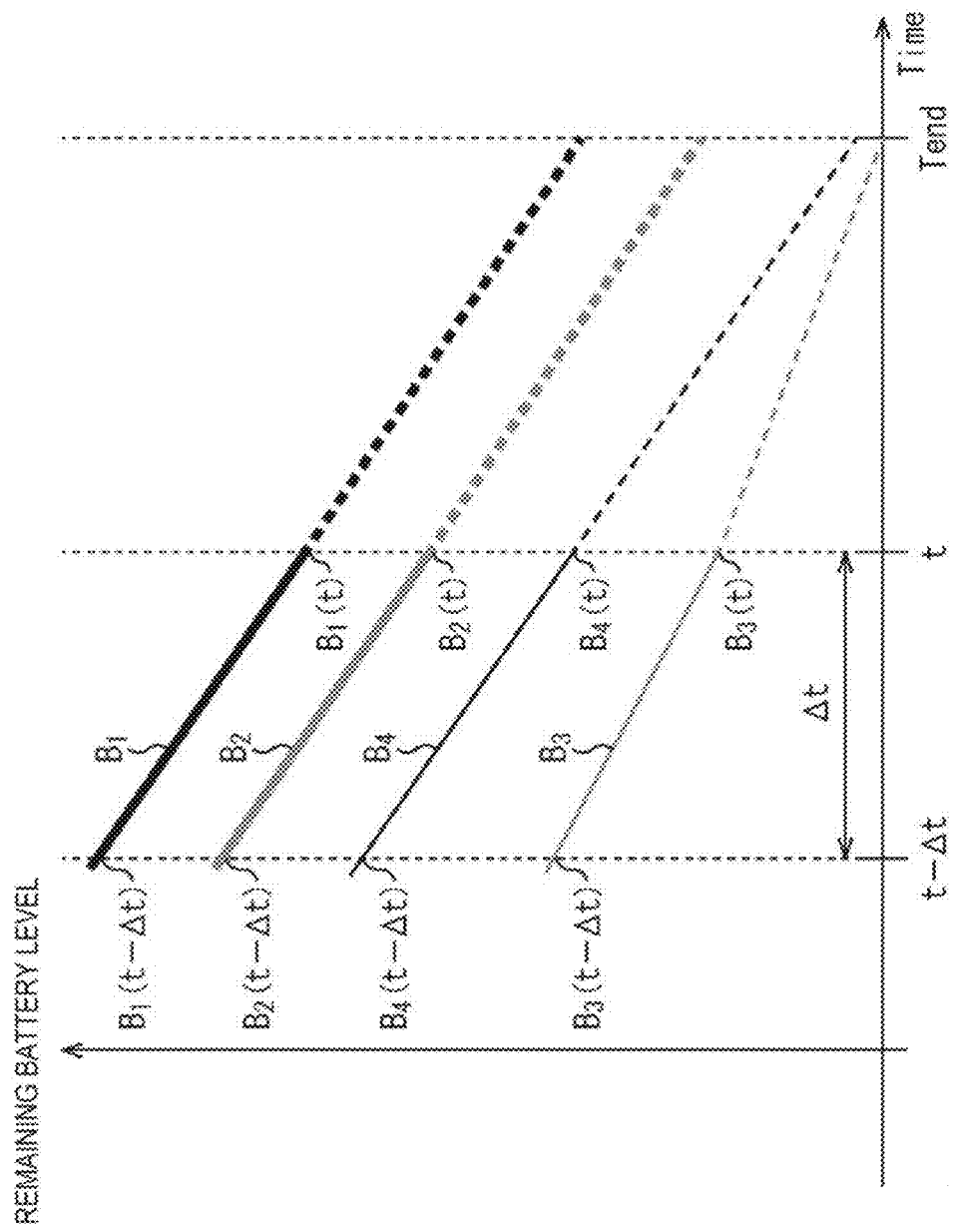
FIG. 19 is a view illustrating relationship between the remaining battery level and remaining recording time.

FIG. 19 is a view illustrating relationship between the remaining battery level and the remaining recording time.

In FIG. 19 also, as in FIG. 10, the time and the remaining battery level at each time are plotted along the abscissa and the ordinate, respectively. Also, graphs B1, B2, B3, and B4 illustrated in FIG. 19 indicate the remaining battery levels of the cameras 12-1 to 12-4, respectively.

In FIG. 19, time from the time t to the time Tend is the remaining recording time and out of the remaining operable time and the remaining recording time of the camera 12-3 at the time t, the remaining operable time of the camera 12-3 is shorter.

Therefore, when the remaining operable time of the sub camera is shorter than the remaining recording time, the recording mode is set (changed) such that the remaining operable time of the sub camera becomes equal to or longer than the remaining recording time according to the difference. According to this, the camera 12-3 may be driven until the time Tend as illustrated in FIG. 19.

Meanwhile, as the recording mode set according to the difference between the remaining recording time and the remaining operable time of the sub camera, the recording mode described with reference to FIGS. 11 and 15 is set.

As described above, the recording mode of the sub camera is set such that the battery of the sub camera is not exhausted before planned recording end time, so that the moving image data of any camera is not missing in the generated multi-view video content and it becomes possible to more certainly increase the degree of perfection of the multi-view video content.

Meanwhile, although the remaining battery level of each of the cameras is transmitted from each of the cameras as the information regarding the remaining operable time of each of the cameras, and the controller calculates the remaining operable time of each of the cameras by using the transmitted remaining battery level in the description above, it is also possible that the remaining operable time itself is transmitted from each of the cameras as the information regarding the remaining operable time of each of the cameras.

In this case, for example, the communication control unit 91 of each of the cameras 12 obtains the remaining battery level of itself, calculates the remaining operable time by using the remaining battery level, and transmits the calculated remaining operable time to the controller 11. In the controller 11, the recording control unit 72 obtains the remaining operable time from each of the cameras 12 and the recording mode setting unit 81 sets the recording mode of the camera 12 on the basis of the remaining operable time from each of the cameras 12.

Also, although the remaining operable time is calculated on the basis of the remaining battery level of each of the cameras and the recording mode of the camera is set, it is also possible that the remaining operable time is calculated on the basis of a remaining recording medium capacity of each of the cameras and the recording mode of the camera is set, or the remaining operable time is calculated on the basis of the remaining battery level and the remaining recording medium capacity of each of the cameras and the recording mode of the camera is set, for example.

<Another Function Configuration Example of Multi-View Video Recording System>

Although the multi-view video recording system is formed of the controller 11 and a plurality of cameras 12 in the description above, it is also possible that one of the plurality of cameras is configured as the control device of the present technology.

Figure 20:
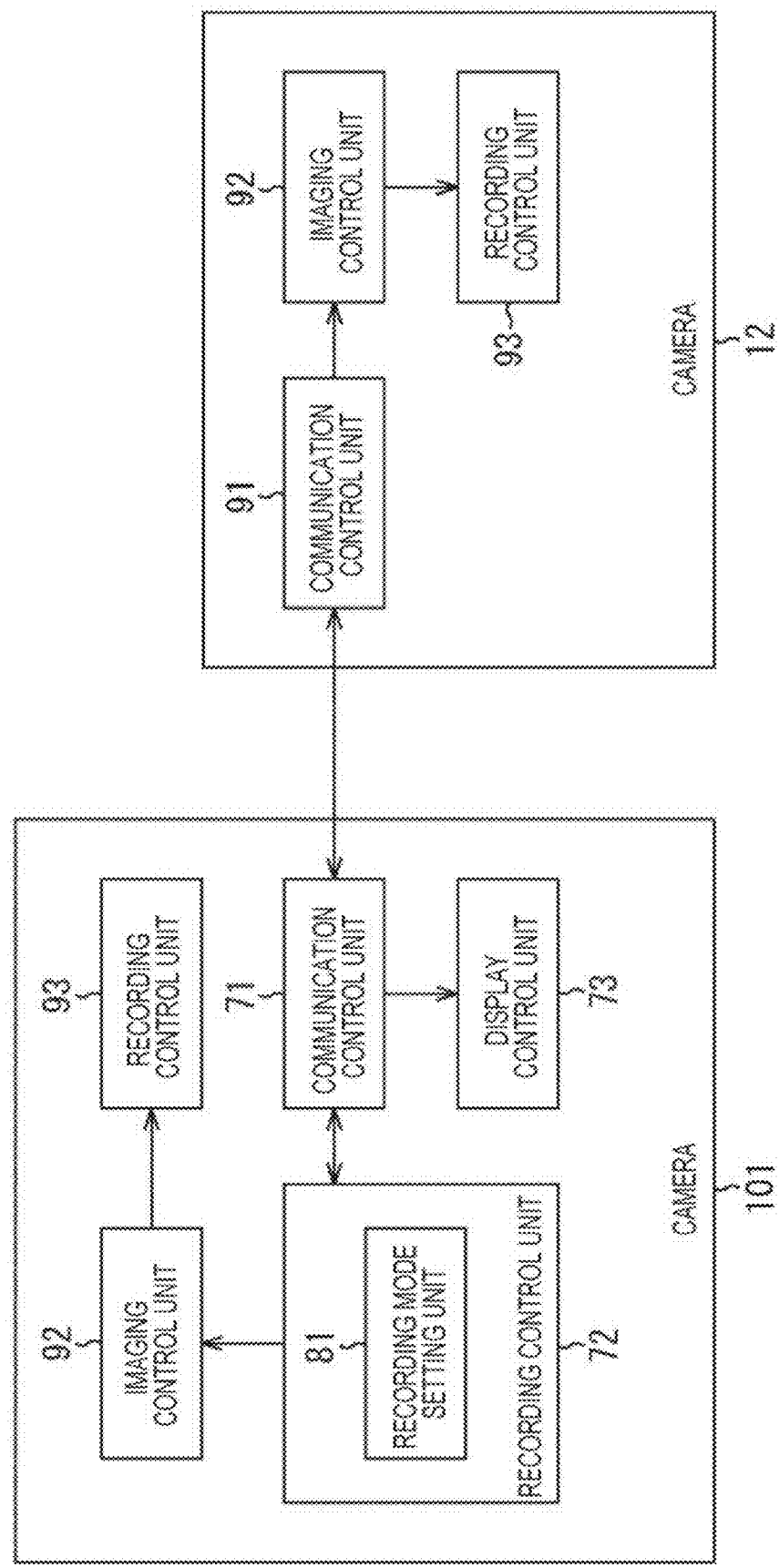
FIG. 20 is a block diagram illustrating another function configuration example of the multi-view video recording system.

FIG. 20 illustrates a function configuration example of a plurality of cameras forming the multi-view video recording system to which the present technology is applied.

In the configuration illustrated in FIG. 20, a camera 101 as the control device of the present technology is provided in place of the controller 11 having the configuration illustrated in FIG. 6.

The camera 101 is provided with the imaging control unit 92 and the recording control unit 93 as is the case with the camera 12 in addition to the communication control unit 71, the recording control unit 72 including the recording mode setting unit 81, and the display control unit 73 provided on the controller 11 having the configuration illustrated in FIG. 6.

In the configuration illustrated in FIG. 20, the recording mode setting unit 81 of the camera 101 sets the recording modes of the camera 12 and the camera 101 on the basis of the information regarding the remaining operable time of each of the camera 101 itself and the plurality of cameras 12 in recording operation.

In such configuration also, it is possible to obtain the above-described action and effect by the recording mode setting process.

<Application Example to Another System>

Although the example of applying the present technology to the multi-view video recording system is described above, the present technology may also be applied to a plurality of terminal devices and a control system which controls operation of the terminal devices.

Figure 21:
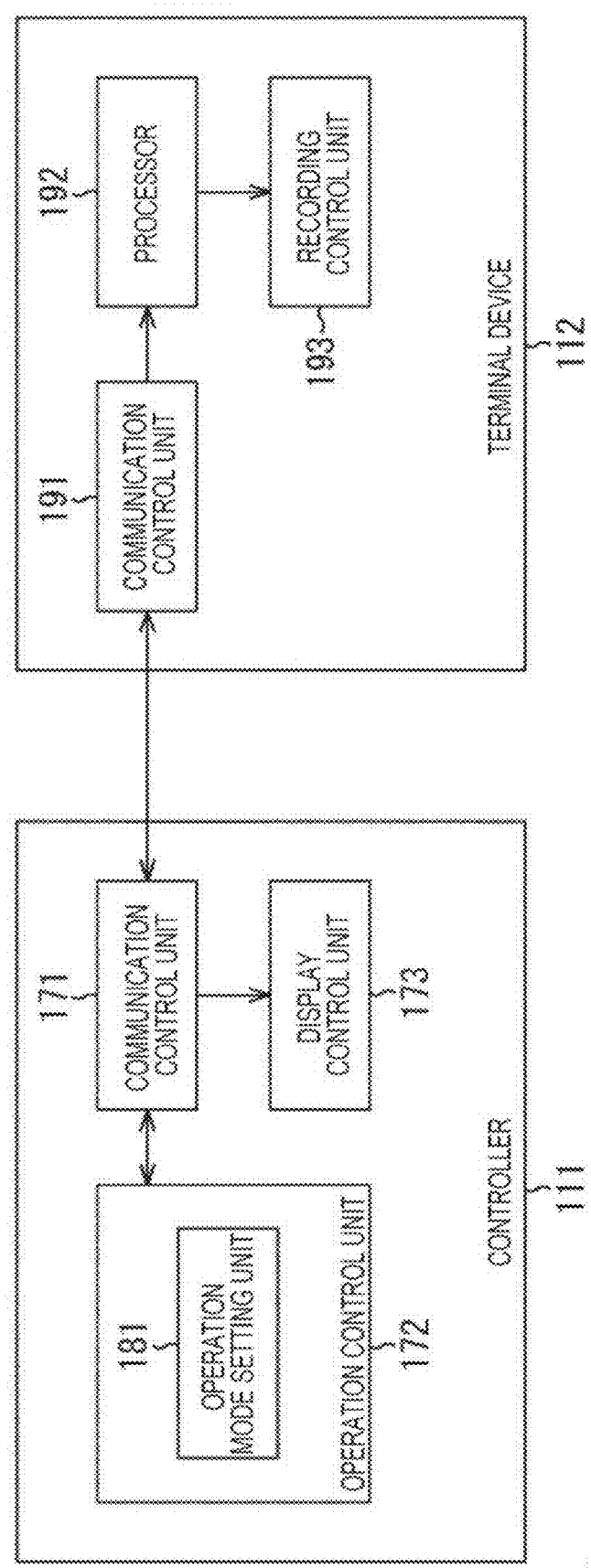
FIG. 21 is a block diagram illustrating a function configuration example of a control system to which the present technology is applied.

FIG. 21 illustrates a function configuration example of a controller 111 and a terminal device 112 which form the control system to which the present technology is applied.

The controller 111 is formed of a communication control unit 171, an operation control unit 172, and a display control unit 173.

The communication control unit 171 controls a communication unit not illustrated to communicate with the terminal device 112.

The operation control unit 172 generates a command for controlling operation of the terminal device 112, thereby controlling the operation of the terminal device 112. Also, the operation control unit 172 is provided with an operation mode setting unit 181 which sets an operation mode of the terminal device 112.

The display control unit 173 controls display of a display unit not illustrated.

Also, the terminal device 112 is formed of a communication control unit 191, a processor 192, and a recording control unit 193.

The communication control unit 191 controls a communication unit not illustrated to communicate with the controller 111.

The processor 192 controls operation of a function unit not illustrated on the basis of the command from the controller 111.

The recording control unit 193 controls recording of data obtained by the operation of the function unit not illustrated in a recording unit not illustrated.

Herein, when the terminal device 112 is configured as a GPS terminal, the operation mode setting unit 181 of the controller 111 sets the operation mode to suppress power consumption required for a positioning process, for example, as the operation mode of the terminal device 112 on the basis of information regarding remaining operable time of each of the terminal devices 112 in operation.

Also, when the terminal device 112 is configured as a portable game device having a communication function, the operation mode setting unit 181 of the controller 111 sets the operation mode to suppress the power consumption regarding emission of back light, for example, as the operation mode of the terminal device 112 on the basis of the information regarding the remaining operable time of each of the terminal devices 112 in operation.

Furthermore, when the terminal device 112 is configured as a flight vehicle provided with a flight mechanism (for example, a drone including a plurality of rotors), the operation mode setting unit 181 of the controller 111 sets the operation mode to suppress the power consumption regarding imaging by a camera (not illustrated) provided on the flight vehicle, for example, as the operation mode of the terminal device 112 on the basis of the information regarding the remaining operable time of each of the terminal devices 112 in operation. Also, for example, this changes the transfer rate when the live view image recorded by the camera provided on the flight vehicle is transferred to the controller 111. Specifically, this sets the transfer rate to a lower value; this changes the transfer rate of 30 fps at normal time to 15 fps, for example.

Furthermore, the terminal devices 112 may also be the devices of different types. For example, suppose that three terminal devices 112 are configured as the camera mounted on each site of the body of the user and each portion of the bicycle which the user rides, the portable game device, and the flight vehicle including the camera described above, respectively. When the three devices simultaneously operate, the operation mode setting unit 181 of the controller 111 sets the above-described operation mode as the operation mode to suppress the power consumption of each of the terminal devices 112 on the basis of the information regarding the remaining operable time of each of the terminal devices 112 in operation.

According to the above-described configuration, the operation mode of another terminal device is set such that the battery of the other terminal device is not exhausted before that of one terminal device, so that it becomes possible to cooperatively operate the terminal devices.

The above-described series of processes may be executed by hardware or may be executed by software. When a series of processes is executed by the software, a program which forms the software is installed on a computer. Herein, the computer includes a computer built in dedicated hardware, a general-purpose personal computer, for example, capable of executing various functions by various programs installed and the like.

Figure 22:
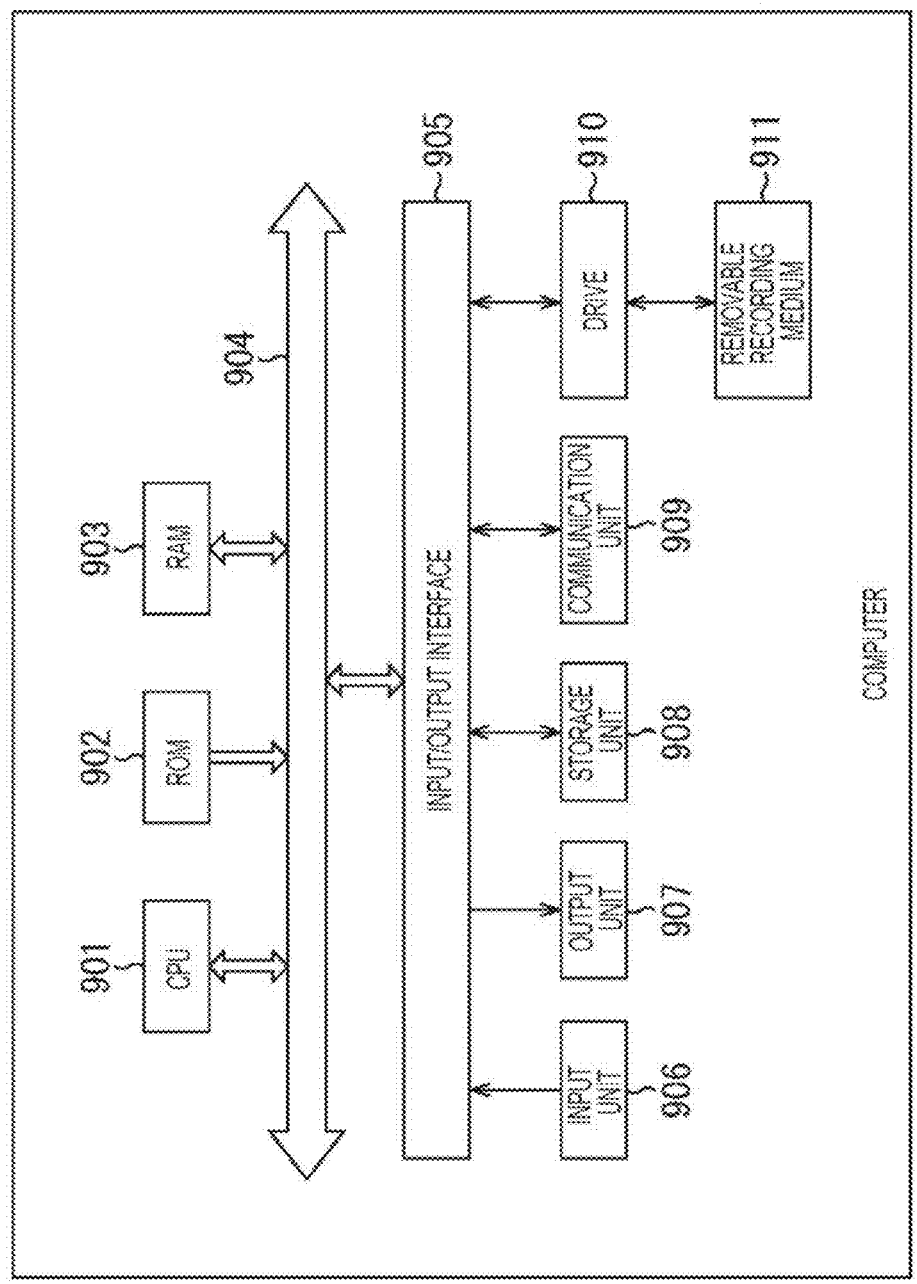
FIG. 22 is a block diagram illustrating a function configuration example of a computer.

FIG. 22 is a block diagram illustrating a configuration example of the hardware of the computer which executes the above-described series of processes by the program.

In the computer, a CPU 901, a read only memory (ROM) 902, and a random access memory (RAM) 903 are connected to one another through a bus 904.

An input/output interface 905 is further connected to the bus 904. An input unit 906, an output unit 907, a storage unit 908, a communication unit 909, and a drive 910 are connected to the input/output interface 905.

The input unit 906 is formed of a keyboard, a mouse, a microphone and the like. The output unit 907 is formed of a display, a speaker and the like. The storage unit 908 is formed of a hard disk, a non-volatile memory and the like. The communication unit 909 is formed of a network interface and the like. The drive 910 drives a removable recording medium 911 such as a magnetic disc, an optical disc, a magnetooptical disc, and a semiconductor memory.

In the computer configured in the above described manner, the CPU 901 loads the program stored in the storage unit 908, for example, on the RAM 903 through the input/output interface 905 and the bus 904 to execute, and according to this, the above-described series of processes is performed.

The program executed by the computer (CPU 901) may be recorded in the removable recording medium 911 as a package recording medium and the like to be provided, for example. Also, the program may be provided by means of a wired or wireless transmission medium such as a local area network, the Internet, and digital broadcasting.

In the computer, the program may be installed on the storage unit 908 through the input/output interface 905 by mounting the removable recording medium 911 on the drive 910. Also, the program may be received by the communication unit 909 by means of the wired or wireless transmission medium to be installed on the storage unit 908. In addition, the program may be installed in advance on the ROM 902 and the storage unit 908.

Meanwhile, the program executed by the computer may be the program of which processes are performed in chronological order in the order described in this description or may be the program of which processes are performed in parallel or at required timing such as when a call is issued.

Also, the embodiment of the present technology is not limited to the above-described embodiment and various modifications may be made without departing from the scope of the present technology.

For example, the present technology may be configured as cloud computing in which a function is shared by a plurality of devices through the network to process together.

Also, each step described in the above-described flowchart may be executed by one device or shared by a plurality of devices to be executed.

Furthermore, when a plurality of processes is included in one step, a plurality of processes included in one step may be executed by one device or shared by a plurality of devices to be executed.

Also, the present technology may have the following configurations.

(1)

A control device including:

an obtaining unit which obtains information regarding remaining operable time of each of a plurality of devices; and a setting unit which sets an operation mode of at least one device out of the plurality of devices on the basis of the information regarding remaining operable time of each of the plurality of devices.

(2)

The control device according to (1), wherein the device has a recording function of taking a moving image to record, and the setting unit sets a recording mode of at least one device out of the plurality of devices on the basis of the information regarding remaining operable time of each of the devices which are recording.

(3)

The control device according to (2), wherein the obtaining unit obtains a remaining battery level of each of the plurality of devices as the information regarding remaining operable time of each of the plurality of devices, and the setting unit calculates remaining operable time of each of the devices by using the remaining battery level of each of the devices which are recording, and sets the recording mode of at least one device out of the plurality of devices on the basis of the calculated remaining operable time of each of the devices.

(4)

The control device according to (3), wherein
the setting unit calculates difference between the remaining operable time of one main device out of the plurality of devices and the remaining operable time of another device, and
sets the recording mode of the other device in accordance with the calculated difference.

(5)

The control device according to (4), wherein
the setting unit calculates difference between a shorter one of the remaining operable time and remaining recording time of the one device and the remaining operable time of the other device, and
sets the recording mode of the other device according to the calculated difference.

(6)

The control device according to (4) or (5), wherein
the setting unit sets the recording mode in which power consumption is suppressed more as the difference is larger for the other device.

(7)

The control device according to any one of (4) to (6), wherein
the setting unit determines the device the remaining battery level of which is the highest out of the plurality of devices as the one device.

(8)

The control device according to any one of (4) to (6), wherein
the setting unit determines the one device on the basis of a posture or a position of each of the devices.

(9)

The control device according to any one of (4) to (6), wherein
the setting unit determines the one device on the basis of a content of the moving image recorded by each of the devices.

(10)

The control device according to any one of (4) to (9), wherein
the setting unit dynamically determines the one device.

(11)

The control device according to any one of (4) to (10), further including:
a display control unit which controls to display the moving image recorded by each of the devices on one display screen in real time.

(12)

The control device according to (11), wherein
the display control unit controls to further display the remaining battery level of each of the devices on the display screen.

(13)

The control device according to (11) or (12), wherein
the display control unit controls to display the moving image recorded by the one device so as to be different from the moving image recorded by the other device.

(14)

The control device according to any one of (11) to (13), wherein
the display control unit controls to display information indicating the recording mode set for the other device on a display area of the moving image recorded by the other device.

(15)

The control device according to any one of (11) to (14), wherein
the display control unit controls to emphasize the display area of the moving image recorded by the other device the recording mode of which is changed.

(16)

The control device according to any one of (11) to (15), wherein
the display control unit controls to display a warning to prompt battery replacement on the display area of the moving image recorded by the other device the remaining battery level of which reaches 0 before the remaining operable time of the one device elapses regardless of the set recording mode.

(17)

The control device according to (2), wherein
the obtaining unit obtains remaining operable time calculated by using a remaining battery level by each of the plurality of devices as the information regarding remaining operable time of each of the plurality of devices, and
the setting unit sets the recording mode of at least one device out of the plurality of devices on the basis of the obtained remaining operable time of each of the devices.

(18)

The control device according to any one of (2) to (17), wherein
the control device has a recording function of taking a moving image to record, and
the setting unit sets the recording mode of at least one device out of the plurality of devices and the control device on the basis of the information regarding remaining operable time of the control device itself and each of the devices which are recording.

(19)

A control method including steps of:
obtaining information regarding remaining operable time of each of a plurality of devices; and
setting an operation mode of at least one device out of the plurality of devices on the basis of the information regarding remaining operable time of each of the plurality of devices,
the steps of obtaining information and setting an operation mode being performed by a control device.

(20)

A program which allows a computer to execute a process including steps of:
obtaining remaining battery levels of a plurality of devices; and
setting an operation mode of at least one device out of the plurality of devices on the basis of information regarding the remaining operable time of each of the plurality of devices.

(21)

A control system including:
a plurality of devices; and
a control device including:
an obtaining unit which obtains information regarding remaining operable time of each of a plurality of devices; and
a setting unit which sets an operation mode of at least one device out of the plurality of devices on the basis of the remaining battery level of each of the plurality of devices.

REFERENCE SIGNS LIST

11 Controller
12-1 to 12-4, 12 Camera
71 Communication control unit
72 Recording control unit 73 Display control unit
81 Recording mode setting unit
101 Camera
111 Controller
112 Camera
172 Recording control unit
181 Operation mode setting unit

The invention claimed is:

1. A control device, comprising:
a Central Processing Unit (CPU) configured to:
obtain first information regarding first remaining operable time of each of a plurality of devices;
set, based on the first information, an operation mode of a first device of the plurality of devices;
obtain second information regarding second remaining operable time of the control device;
set, based on the first information and the second information, a recording mode of the first device; and
control, based on the set recording mode, the first device to record a first moving image.

2. The control device according to claim 1, wherein the CPU is further configured to:
obtain, as the first information, a remaining battery level of each of the plurality of devices;
calculate, based on the first information, the first remaining operable time of each of the plurality of devices; and
set, based on the first remaining operable time of each of the plurality of devices, the recording mode of the first device.

3. The control device according to claim 2, wherein the CPU is further configured to:
calculate a first difference between the first remaining operable time of the first device, and the first remaining operable time of a second device of plurality of devices; and
set, based on the first difference, the recording mode of the second device.

4. The control device according to claim 3, wherein the CPU is further configured to:
calculate a second difference between a shorter one of the first remaining operable time and a remaining recording time of the first device, and the first remaining operable time of the second device, and
set, based on the second difference, the recording mode of the second device.

5. The control device according to claim 3, wherein the CPU is further configured to:
suppress, based on the first remaining operable time, power consumption of the first device and the second device; and
set the recording mode based on the suppressed power consumption.

6. The control device according to claim 3, wherein the CPU is further configured to determine, as the first device, a device from the plurality of devices of which the remaining battery level is the highest among the plurality of devices.

7. The control device according to claim 3, wherein the CPU is further configured to determine the first device from the plurality of devices based on at least one of a posture or a position of each of the plurality of devices.

8. The control device according to claim 3, wherein the CPU is further configured to determine the first device from the plurality of devices based on content of the first moving image.

9. The control device according to claim 3, wherein the CPU is further configured to dynamically determine the first device from the plurality of devices.

10. The control device according to claim 3,
wherein the CPU is further configured to control a display screen to display, in real time, the first moving image recorded by the first device.

11. The control device according to claim 10, wherein the CPU is further configured to control the display screen to display the remaining battery level of each of the plurality of devices.

12. The control device according to claim 10,
wherein the CPU is further control the display screen to display the first moving image that is recorded by the first device, and
wherein the first moving image is different from a second moving image recorded by the second device.

13. The control device according to claim 10, wherein the CPU is further configured to control the display screen to display third information, which indicates the recording mode set for the second device, on a display area of a second moving image that is recorded by the second device.

14. The control device according to claim 10,
wherein the CPU is further configured to control the display screen to display a warning to prompt battery replacement on a display area of a second moving image that is recorded by the second device, and
wherein the remaining battery level of the second device reaches 0 before the first remaining operable time of the first device elapses.

15. The control device according to claim 1, wherein the CPU is further configured to:
obtain a remaining battery level of each of the plurality of devices; and
calculate, based on the obtained remaining battery level of each of the plurality of devices, the first remaining operable time of each of the plurality of devices,
wherein the remaining battery level of each of the plurality of devices corresponds to the first information.

16. A method, comprising
in a control device:
obtaining first information regarding first remaining operable time of each of a plurality of devices;
setting, based on the first information, an operation mode of at least one device of the plurality of devices;
obtaining second information regarding second remaining operable time of the control device;
setting, based on the first information and the second information, a recording mode of the at least one device; and
controlling, based on the set recording mode, the at least one device to record a moving image.

17. A non-transitory computer-readable medium having stored thereon computer readable instructions, which when executed by a control device, cause the control device to execute operations, the operations comprising:
obtaining first information regarding first remaining operable time of each of a plurality of devices;
setting, based on the first information, an operation mode of at least one device of the plurality of devices;
obtaining second information regarding second remaining operable time of the control device;
setting, based on the first information and the second information, a recording mode of the at least one device; and controlling, based on the set recording mode, the at least one device to record a moving image.

18. A control system, comprising:
a plurality of devices; and
a control device which comprises a Central Processing Unit (CPU) configured to:
  obtain first information regarding first remaining operable time of each of a plurality of devices;
  set, based on the first information, an operation mode of at least one device of the plurality of devices;
  obtain second information regarding second remaining operable time of the control device;
  set, based on the first information and the second information, a recording mode of the at least one device; and
  control, based on the set recording mode, the at least one device to record a moving image.

* * * * *